United States Patent [19]
Parlos et al.

[11] Patent Number: 5,479,571
[45] Date of Patent: Dec. 26, 1995

[54] NEURAL NODE NETWORK AND MODEL, AND METHOD OF TEACHING SAME

[75] Inventors: Alexander G. Parlos; Amir F. Atiya, both of College Station; Benito Fernandez, Austin, all of Tex.; Wei K. Tsai, Irvine, Calif.; Kil T. Chong, College Station, Tex.

[73] Assignee: The Texas A&M University System, College Station, Tex.

[21] Appl. No.: 46,936

[22] Filed: Apr. 13, 1993

Related U.S. Application Data

[63] Continuation of Ser. No. 715,582, Jun. 14, 1991, abandoned.
[51] Int. Cl.$^6$ .................................................. G06F 15/18
[52] U.S. Cl. .............................. 395/21; 395/23; 395/24
[58] Field of Search ................................. 395/22, 23, 24, 395/21, 25

[56] References Cited

U.S. PATENT DOCUMENTS

| | | | |
|---|---|---|---|
| 4,752,906 | 6/1988 | Kleinfeld | 395/24 |
| 4,963,725 | 10/1990 | Hong et al. | 395/25 |
| 5,050,096 | 9/1991 | Seidman et al. | 395/27 |
| 5,058,034 | 10/1991 | Murphy et al. | 395/23 |
| 5,093,899 | 3/1992 | Hiraiwa | 395/23 |
| 5,113,482 | 5/1992 | Lynne | 395/23 |
| 5,129,039 | 7/1992 | Hiraiwa | 395/24 |
| 5,130,936 | 7/1992 | Sheppard et al. | 395/22 |
| 5,182,794 | 1/1993 | Gasperi et al. | 395/23 |

OTHER PUBLICATIONS

Luenberger, "Introduction ot Linear and Nonlinear Programming", Additson–Wesley Publishing Company, 1973, p. 294.
Fernandez et al., "Nonlinear Dynamic System Identification Using Artificial Neural Networks (ANNS)", International Joint Conference on Neural Networks, 1990, pp. II–133–II–141.
Simpson, "Artificial Neural Systems Foundations, Paradigms, Applications, and Implementations", 1990, pp. 100–101.
Vanderplaats, "Numerical Optimization Techniques For Engineering Design", 1984, pp. 75–76.
Rumelhart, et al, "Learning Internal Representations by Error Propagation," Parallel Distributed Processing, vol. 1 Foundations, Rumelhart & McClelland, eds, 1986, pp. 318–362.
Greco, et al., "A Recurrent Time Delay Neural Network for Improved Phoneme Recognition," ICASSP, May 1991, 81–84.

(List continued on next page.)

*Primary Examiner*—Robert W. Downs

[57] ABSTRACT

The present invention is a fully connected feed forward network that includes at least one hidden layer 16. The hidden layer 16 includes nodes 20 in which the output of the node is fed back to that node as an input with a unit delay produced by a delay device 24 occurring in the feedback path 22 (local feedback). Each node within each layer also receives a delayed output (crosstalk) produced by a delay unit 36 from all the other nodes within the same layer 16. The node performs a transfer function operation based on the inputs from the previous layer and the delayed outputs. The network can be implemented as analog or digital or within a general purpose processor. Two teaching methods can be used: (1) back propagation of weight calculation that includes the local feedback and the crosstalk or (2) more preferably a feed forward gradient decent which immediately follows the output computations and which also includes the local feedback and the crosstalk. Subsequent to the gradient propagation, the weights can be normalized, thereby preventing convergence to a local optimum. Education of the network can be incremental both on and off-line. An educated network is suitable for modeling and controlling dynamic nonlinear systems and time series systems and predicting the outputs as well as hidden states and parameters. The educated network can also be further educated during on-line processing.

7 Claims, 17 Drawing Sheets

OTHER PUBLICATIONS

Franzini, et al., "Speaker-Independent Recognition of Connected Utterances Using Recurrent and Non-recurrent Neural Networks," IJCNN, Jun. 1989, II-1-II-6.

Chu, et al, "Neural Networks for System Indentification", IEEE Control Systems Mag., Apr. 1990, 31-35.

Principe, et al., "Chaotic Dynamics of Time-delay Neural Networks," IJCNN, Jun. 1990, II-403-II-409.

Abe, S., "Learning by Parallel Forward Propagation," IJCNN, Jun. 1990, III-99-III-104.

Doya, K., "Learning Temporal Patterns in Recurrent Neural Networks," IEEE Int'l-Conf. on Syst., Man and Cybernetics, Nov. 1990, 170-172.

Simpson, P. K., Artificial Neural Systems: Foundations, paradigms, applications, and implementations, Pergamon Press, Inc., 85-94, 1990.

Kruschke, et al., "Benefits of Gain: Speeded Learning and Minimal Hidden Layers in Back-Propagation Neworks," IEEE Trans. on Systems, Man, and Cybernetics, Jan./Feb. 1991, 273-280.

Hecht-Nielsen, R., "Counter Propagation Networks," IEEE Int'l. Conf. on Neural Networks, 1987, II-19-32.

Pearlmutter, B. A., "Learning State Space Trajectories in Recurrent Neural Networks," 1989 IEEE Int'l. Conf. on Neural Networks, Jun. 1989, II-365-372.

Chauvin, Y., "Principal Component Analysis by Gradient Descent on a Constrained Linear Hebbian Cell," 1989 IEEE Int'l. Conf. on Neural Networks, Jun. 1989, I-373-380.

Tenorio, et al., "Self-Organizing Network for Optimum Supervised Learning," IEEE Trans. on Neural Networks, Mar. 1990, 100-110.

Wang, et al, "Complex Temporal Sequence Learning Based on Short-term Memory," Proceedings of the IEEE, Sep. 1990, 1536-1543.

Pineda, F. J., "Recurrent Backpropagation and the Dynamical Approach to Adaptive Neural Computation," Neural Computation, vol. 1, pp. 161-172, 1989.

Williams, R. J. And D. Zipser, "A Learning Algorithm for Continually Running Fully Recurrent Neural Networks," Neural Computation, vol. 1, pp. 270-280, 1989.

Cybenko, G., "Approximation by Superposition of a Sigmoidal Function," Mathematics of Control, Signals, and Systems, (1989) 2:303-314.

Heck-Nielsen, R., Neurocomputing, Addison-Wesley Publishing Company, 1990.

Lapedes, A. and R. Farber, "How Neural Nets Work," Proc. of the 1987 International Joint Conference on Neural Networks, Jul. 1987, Denver, Colo., also LA-UR-88-418.

Pearlmutter, B. A., "Dynamic Recurrent Neural Networks," Report CMU-CU-90-196, Dec. 1990.

Werbos, P. J. "Backpropagation Through Time: What it Does and How to Do It," Proc. of the IEEE, vol. 78, No. 10, Oct. 1990.

Parlos, A. G., B. Fernandez, A. F. Atiya, J. Muthusami, and W. K. Tsai, "An Accelerated Learning Algorithm for Multilayer Perceptron Networks," paper submitted to the IEEE Trans. on Neural Networks, Sept. 1991 (Revised Feb. 1992).

Williams, R. J. and J. Peng, "An Efficient Gradient-Based Algorithm for On-Line Training of Recurrent Network Trajectiories," Neural Computation, vol. 2, pp. 490-501, 1990.

Ljung, L. and S. Gunnarson, "Adaptive and Tracking in System Identification-A Survey," Automatica, vol. 26, No. 1, pp. 7-21, 1990.

Tsai, W. K., A. G. Parlos, and G. Verghese, "Bounding the States of Unknown Systems," International Journal of Control, vol. 52, No. 4, pp. 223-245, 1990.

Proc. Natl. Acad. Sci. USA, vol. 79, "Neural Networks and Physical Systems with Emergent Collective Computational Abilities", by J. J. Hopfield, Apr. 1982, pp. 2554-2558.

American Physical Soceity, vol. 59, No. 19, Nov. 9, 1987, "Generalization of Back-Propagation to Recurrent Neural Networks", by Fernando J. Pineda, pp. 2229-2232.

IEEE Transactions of Neural Networks, vol. 1, No. 1, Mar. 1990, "Identification an Control of Dynamical Systems Using Neural Networks", by Kumpati S. Narendra and Kannan Parthasarathy, pp. 4-27.

Luis B. Almeida, "A learning rule for asynchronous perceptrons with feedback in a combinatorial environment," Proceedings of IEEE First International Conference on Neural Networks, II, pp. 609-618, 1987.

Luis B. Almeida, "Backpropagation in non-feedforward networks," in Neural Computing Architectures: The Design of Brain-Like Machines by Igor Aleksander (Ed.), MIT Press, 1989.

A. F. Atiya, "Learning on a General Network," Neural Information Processing Systems, by Dana Anderson (Ed.), American Institute of Physics, New York, 1988.

N. Bhat and T. J. McAvoy, "Use of Neural Nets for Dynamic Modeling and Control of Chemical Process Systems," Computers and Chemical Engineering, vol. 14, No. 4/5, pp. 573-583, 1990.

S. A. Billings, H. B. Jamaluddin and S. Chen, "A Comparison of the Backpropagation and Recursive Prediction Eror Algorithms for Training Neural Networks," Technical Report No. 379, Jan. 1990.

S. A. Billings, "Identification of Nonlinear Systems-A Survey," IEE Proc. D, Control Theory and Applications, 1980, 127, (6) pp. 272-285.

R. Haber and H. Unbehauen, "Structure Idenfification of Nonlinear Dynamic Systems-A Survey on Input/Output Approaches," Automatica 26:4-A, pp. 651-677, 1990.

J. J. Hopfield, "Neural Networks and physical systems with emergent collective computational abilities," Proc. Nat. Acad. Sci. U.S., vol. 79, pp. 2554-2558, Apr. 1982.

L. Ljung, "Issues in System Identification," Control Systems Magazine, pp. 25-32, Jan. 1991.

A. G. Parlos, et al., "Nonlinear Identification of Power Plant Dynamics using Neural Networks," submitted to Nuclear Technology, Jan. 1991.

F. J. Pineda, "Generalization of Back-Propatation to Recurrent Neural Networks,"Physical Review Letters, vol. 59, No. 19, pp. 2229-2232, Nov. 1987.

K. S. Narendra and K. Parthasarathy, "Identification and Control of Dynamical Systems Using Neural Networks," IEEE Transactions on Neural Networks, vol. 1, No. 1, Mar. 1990.

86/90

$R_2C_2CCR_1C_1$

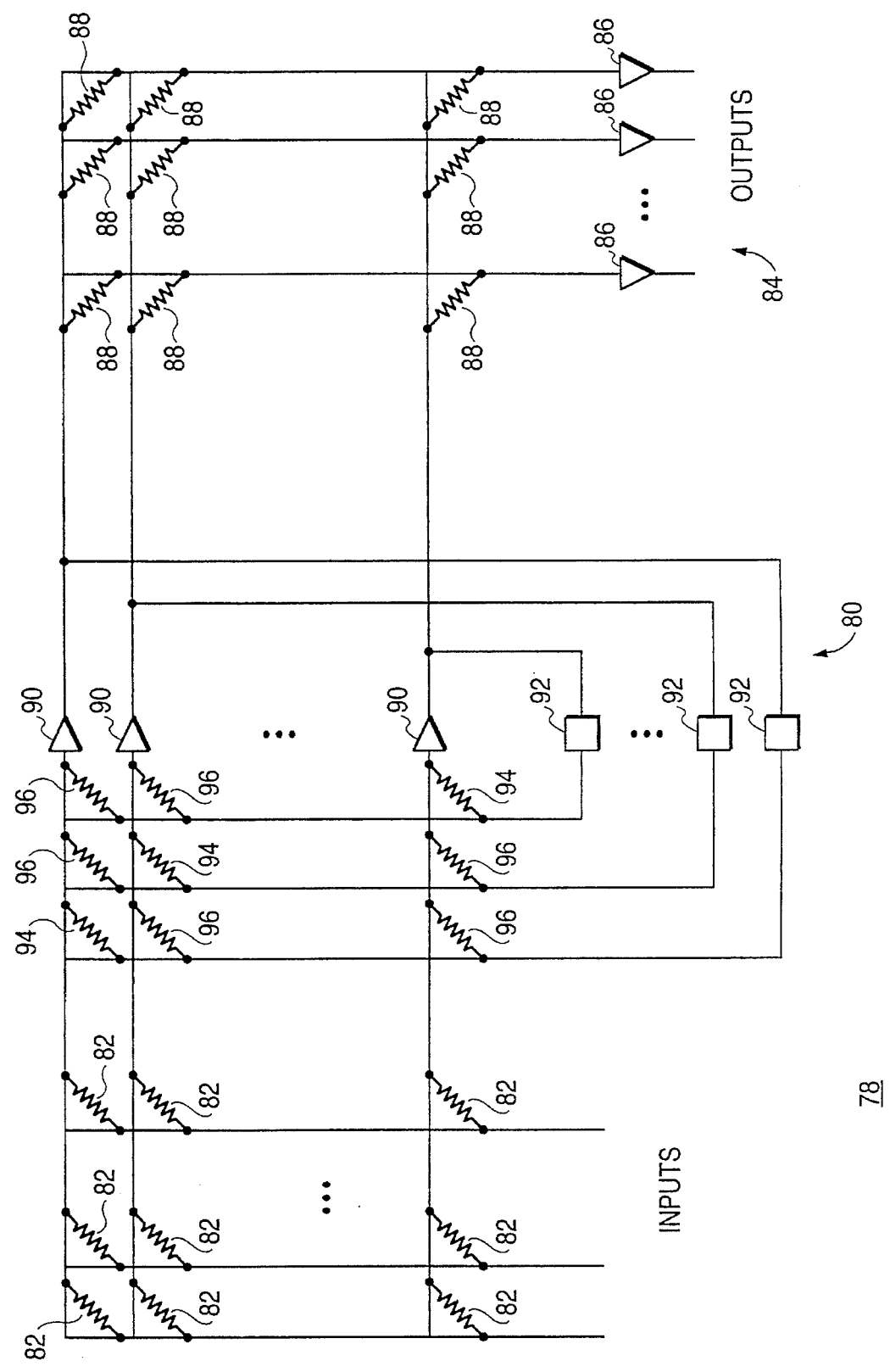

NEURAL NODE NETWORK AND MODEL, AND METHOD OF TEACHING SAME

LICENSE RIGHTS

The U.S. Government has a paid-up license in this invention and the right in limited circumstances to require the patent owner to license others on reasonable terms as provided by the terms of Grant Nos. DE-FG07-89ER12893 and NAG9-491 awarded by the Department of Energy and NASA Johnson Space Center, respectively. This application is a continuation of application Ser. No. 07/715,582, filed Jun. 14, 1991, now abandoned.

BACKGROUND OF THE INVENTION

1. Field of the Invention

The present invention is directed to a neural node network with local feedback and crosstalk along with a method of teaching same and, more particularly, to a feed forward neural network with local node feedback and crosstalk between nodes within a layer, in which the learning method includes feed forward weight modification along with propagation of the local feedback and crosstalk during the weight modification, with the network being used to develop a model of an actual system, where the model can be used to determine hidden states or parameters of the actual system or expected outputs of the actual system to possible input changes.

2. Description of the Related Art

Conventional perception based neural networks include input and output layers and hidden layers between the input and output layers. The hidden layers are fully connected, that is each node in a hidden layer is connected to all the nodes in a prior layer and to all nodes in a subsequent layer. Each of the nodes conventionally sums weighted inputs to the node and then performs a transfer function operation such as a threshold comparison operation to produce an output to the next layer. The transfer function is sometimes called a transform function, an activation function, a gain function, a squashing function, a threshold function, or a sigmoid function. Since the introduction of recurrent neural networks by Hopfield a number of researchers have considered various architectures and learning algorithms. The most prominent among these are (1) the real time recurrent learning which uses a purely feedback network, (2) back propagation through time which uses a purely feed forward network, (3) recurrent back propagation trained to recognize fixed points, (4) the use of the previous approach to learning the trajectory of unforced systems, (5) dynamic back propagation and (6) the grouping of feedback links as nodes of a feed forward network. None of these architectures provides a suitable network for modeling and controlling dynamic nonlinear systems and none of the learning methods are particularly efficient at converging to an optimum solution for dynamic nonlinear systems.

SUMMARY OF THE INVENTION

It is an object of the present invention to provide a feed forward neural network with local recurrency and intralayer recurrency.

It is also an object of the present invention to produce a network that can model dynamic nonlinear systems to predict system outputs and hidden states or parameters.

It is an additional object of the present invention to provide a learning method that educates the network using the local and intralayer recurrency.

It is a further object of the present invention to provide a learning method that improves learning speed by feed forward gradient modification trailing one layer behind output computations or within the layer computations but subsequent to the output computations.

It is still another object of the present invention to provide a learning method that ensures global optimization by avoiding local optimal through weight normalization via zeroth and/or higher order moments of the error gradients.

It is a further object of the present invention to provide a modeling method capable of modeling and controlling nonlinear dynamic systems and time series systems, thereby allowing the simulation of dynamic nonlinear system responses and the determination of hidden states and parameters for such systems.

The above objects can be attained by a network that includes fully connected hidden layers. Each hidden layer includes nodes in which the output of the node is fed back to that node as an input with a unit delay occurring in the feedback path (local feedback). Each node within each layer also receives a delayed output (crosstalk) from all the other nodes within the same layer. During the teaching phase, back propagation of the weights using a gradient decent method that includes the local feedback and the crosstalk can be performed. The teaching phase can also utilize a feed forward gradient decent method which follows the output computations and that also includes the local feedback and the crosstalk. Subsequent to the weight propagation, the weights can be normalized, thereby preventing entrapment in a local optimum. An educated network is suitable for modeling dynamic nonlinear systems and time series systems and is capable of predicting system outputs as well as hidden states and parameters. Furthermore an educated network can be used to control a non-linear dynamic system. The educated network can also be further educated during on-line processing for prediction of system outputs, hidden state or parameters, as well as for control of dynamic nonlinear systems.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 illustrates an analog implementation of a network in accordance with the present invention;

DESCRIPTION OF THE PREFERRED EMBODIMENTS

Figure 1:
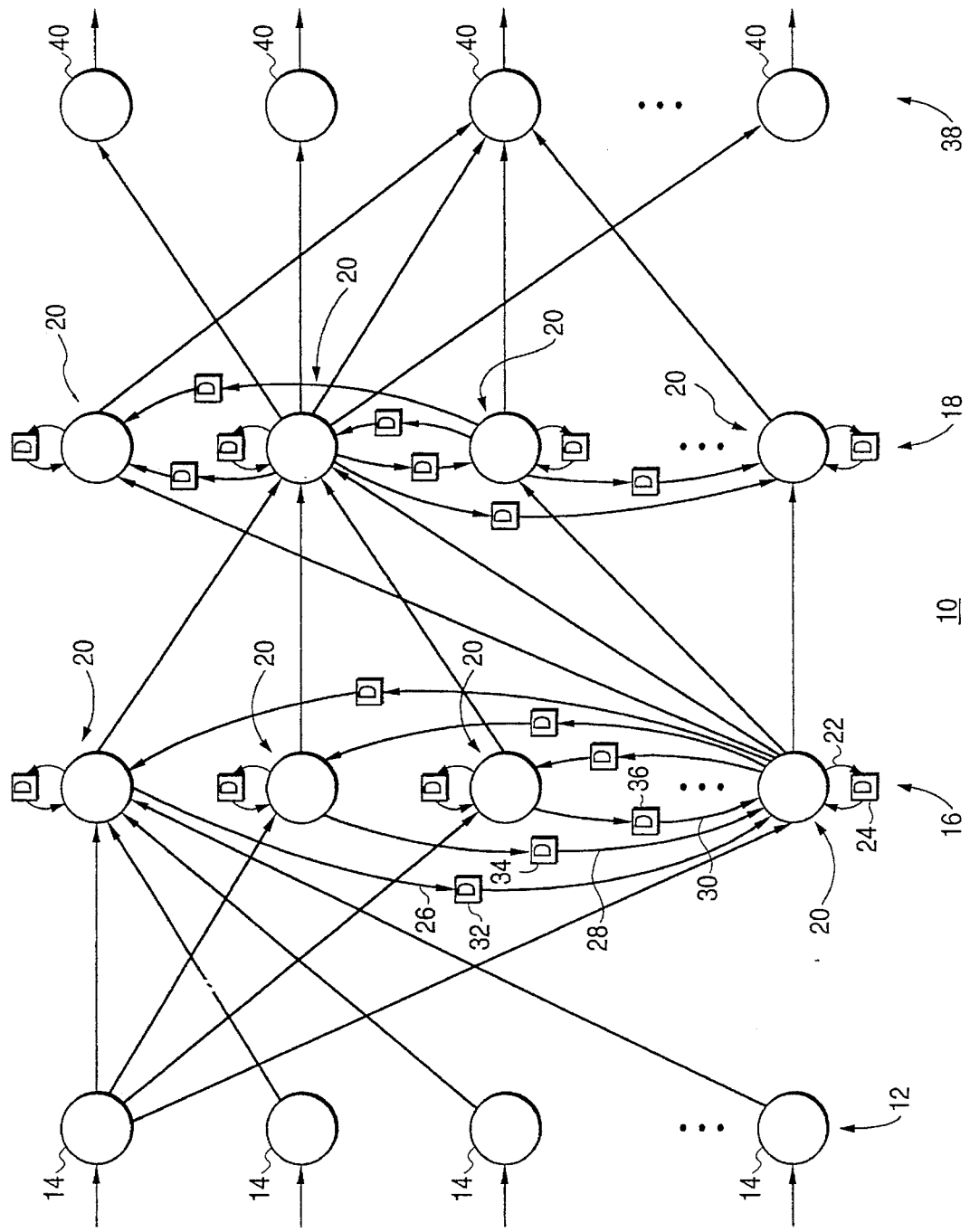
FIG. 1 illustrates a network in accordance with the present invention.

The present invention, as illustrated in FIG. 1, comprises a feed forward multilayer perception network 10 augmented with (locally) recurrent (node output is fed back to itself after a unit delay) and crosstalk (node output is fed to other nodes of the same layer after a unit delay) feedback links. The delay links allow the nodes to maintain past information or memory and process the memory along with current inputs, thereby allowing the network to model temporal nonlinearities.

This network 10 includes an input layer 12 with input nodes 14 which act as buffers or storage elements. The network 10 also preferably includes two hidden layers 16 and 18, although a single hidden layer or more than two hidden layers could be provided.

Each hidden layer includes recurrent crosstalk nodes 20. These nodes 20 each have a local feedback loop 22 with a unit delay 24 in the feedback path. Each node 20 also includes crosstalk links 26, 28 and 30 from the nodes within that layer. Each of the crosstalk links also has a unit delay 32, 34 and 36. This results in connection of each node within each layer to every other node within that layer. Additional details with respect to the node will be described with respect to FIG. 2.

The first hidden layer 16 is fully connected to the input layer 12, the second hidden layer 18 is fully connected to the first hidden layer 16 and an output layer 38 is fully connected to the last hidden layer 18. The hidden layers 16 an 18 can include more or less nodes than each of the input 12 and output 38 layers, and it is preferred that the hidden layers not have the same number of nodes as the input or output layers and the number of nodes for the subsequent hidden layers being less than for preceding layers. In a typical implementation the number of nodes 14 in the input layer 12 equals the number of inputs to a system being modeled and the number of output nodes 40 in the output layer 38 equals the number of outputs in the system being modeled.

Output nodes 40 of the output layer 38 can each be a simple summing buffer, or perform the transfer function of the hidden layer nodes 20 without the local feedback and crosstalk, or perform a transfer function different from the hidden layer also without the feedback and crosstalk.

Figure 2:
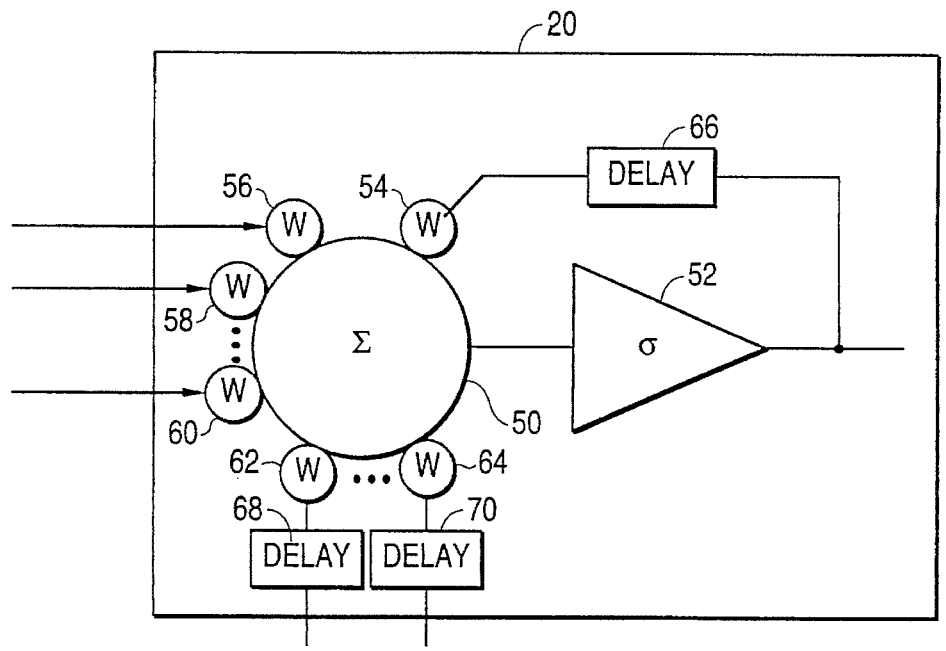
FIG. 2 illustrates a operations of a node in accordance with the present invention.

The basic elements of a node 20 (or 40) in accordance with the present invention, as illustrated in FIG. 2, are a summing unit 50 and a transfer function unit 52. The summing unit 50 performs a conventional sum of all its inputs while the transfer function unit 52 performs a discriminatory function and can be any of the transfer functions used in the neural networks such as linear, saturation, sigmoid, hyperbolic tangent, or any other function. The sigmoid and hyperbolic tangent transfer functions are preferred for the hidden layers and the linear and saturation functions are preferred for the output layer 38, however, each hidden layer can perform a different transfer function. Each node also includes weight multiplication units 54–64 which multiply the incoming signals by a weight which is adjusted during the learning process. The output of the transfer function unit 52 is fed back through a unit delay device 66 before being multiplied by the weight multiplication unit 54. The nodes 56–60 receive inputs from the previous layer in the network while the weight units 62–64 receive inputs from the other nodes in the layer (the crosstalk) through unit delay devices 68 and 70. Although a single time unit delay is preferred in both the feedback and crosstalk paths, the time delay could be more than one time unit and the delays in the feedback and crosstalk paths need not be equal.

Figure 4:
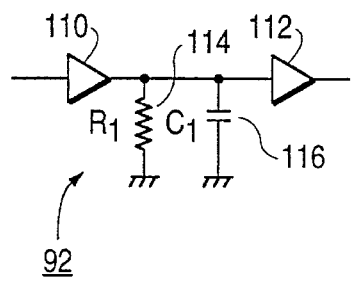
FIGS. 4 and 5 illustrate components of the network of FIG. 3 for continuous time implementation.
Figure 5:
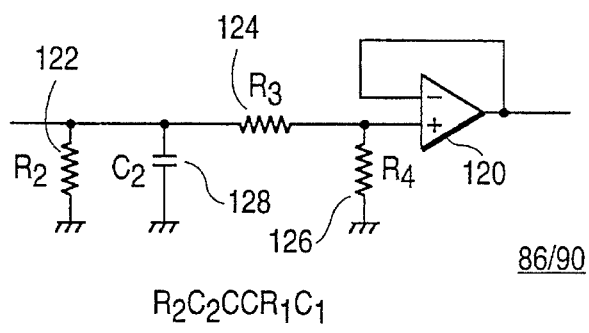

FIG. 3 illustrates an analog embodiment of the present invention in which a single hidden layer 80 is used. The inputs to the network 78 are weighted by weighting resistors 82, while the output layer 84 includes transfer function amplifier units 86 and weight resistors 88. The hidden layer 80 includes transfer function amplifier units 90, delay units 92, feedback weight resistors 94 and crosstalk weight resistors 96. A typical delay in an analog device would be approximately 10 μsecs. The details of the delay unit 92 for a continuous time analog network are illustrated in FIG. 4, and the details of the transfer function units 86 and 90 are illustrated in FIG. 5.

The delay unit 92 (FIG. 4) for the continuous time analog implementation includes conventional amplifiers 110 and 112 as well as a resistor 114 and a capacitor 116. The transfer function amplifier units 86 and 90 (FIG. 5) include an operational amplifier 120, resistors 122–126 and a capacitor 128. The relationship between the resistors and capacitors in the unit delay 90 should result in $R_2C_2$ being much, much less than $R_1C_1$.

Figure 6:
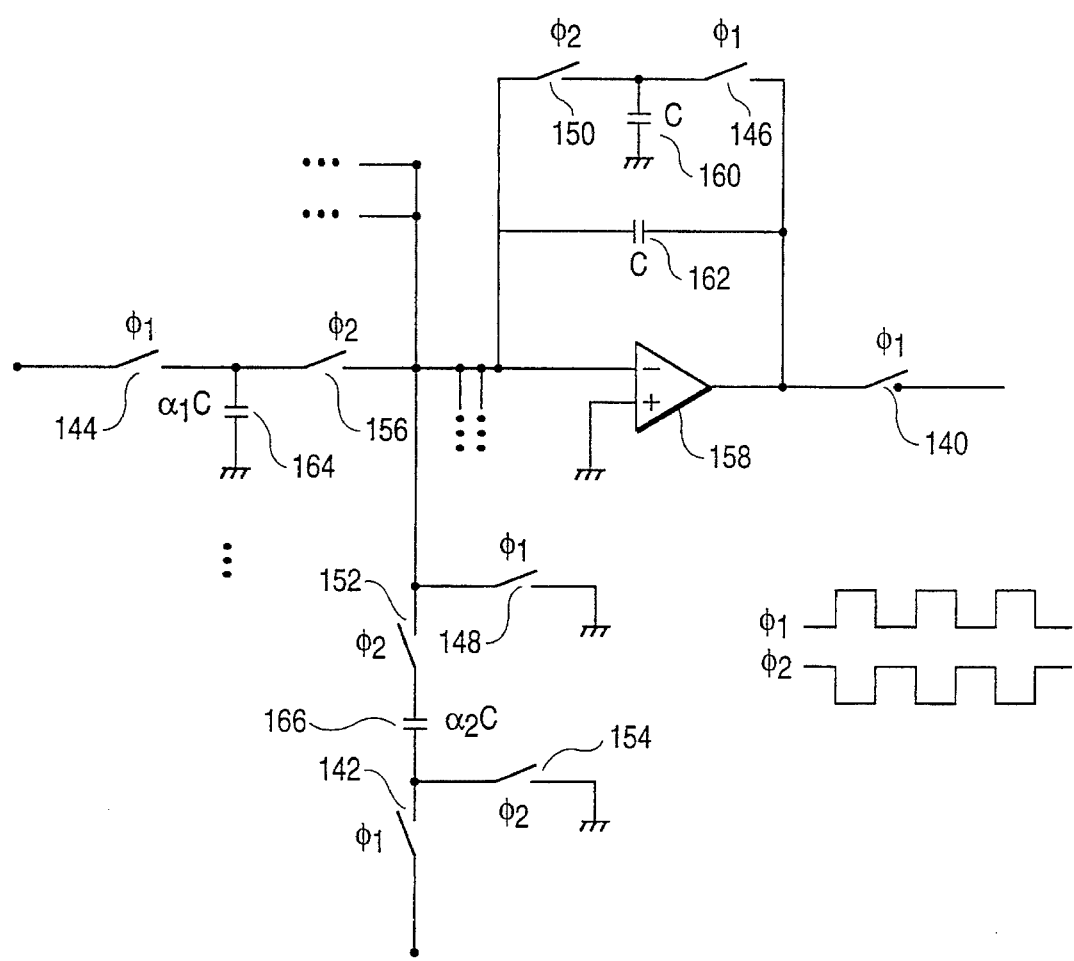
FIG. 6 illustrates components of the network of FIG. 3 for discrete time implementation.

FIG. 6 illustrates a discrete time analog implementation of the nodes of the network 10. The device illustrated in FIG. 6 implements not only the transfer function of the network of FIG. 3, as well as the local and crosstalk delay, but also the input weights provided by resistors 82 in FIG. 3 and the crosstalk and feedback weights provided by resistors 94 and 96. This device includes switching transistors 140–148 controlled by a first phase signal $\phi_1$ which, as shown, is 180° out of phase with a second phase signal $\phi_2$ and which controls. switching transistors 150–156. The output of an operational amplifier 158 is fed back through capacitors 160 and 162, where one of the inputs from the prior layers, the recurrent input or one of the cross talk inputs, is weight adjusted by capacitor 164 when the weight is negative and is adjusted by the capacitor 166 when the weight is positive. The weight value is $-\alpha_1$ in the negative weight situation and is $\alpha_2$ in the positive weight situation.

Figure 7:
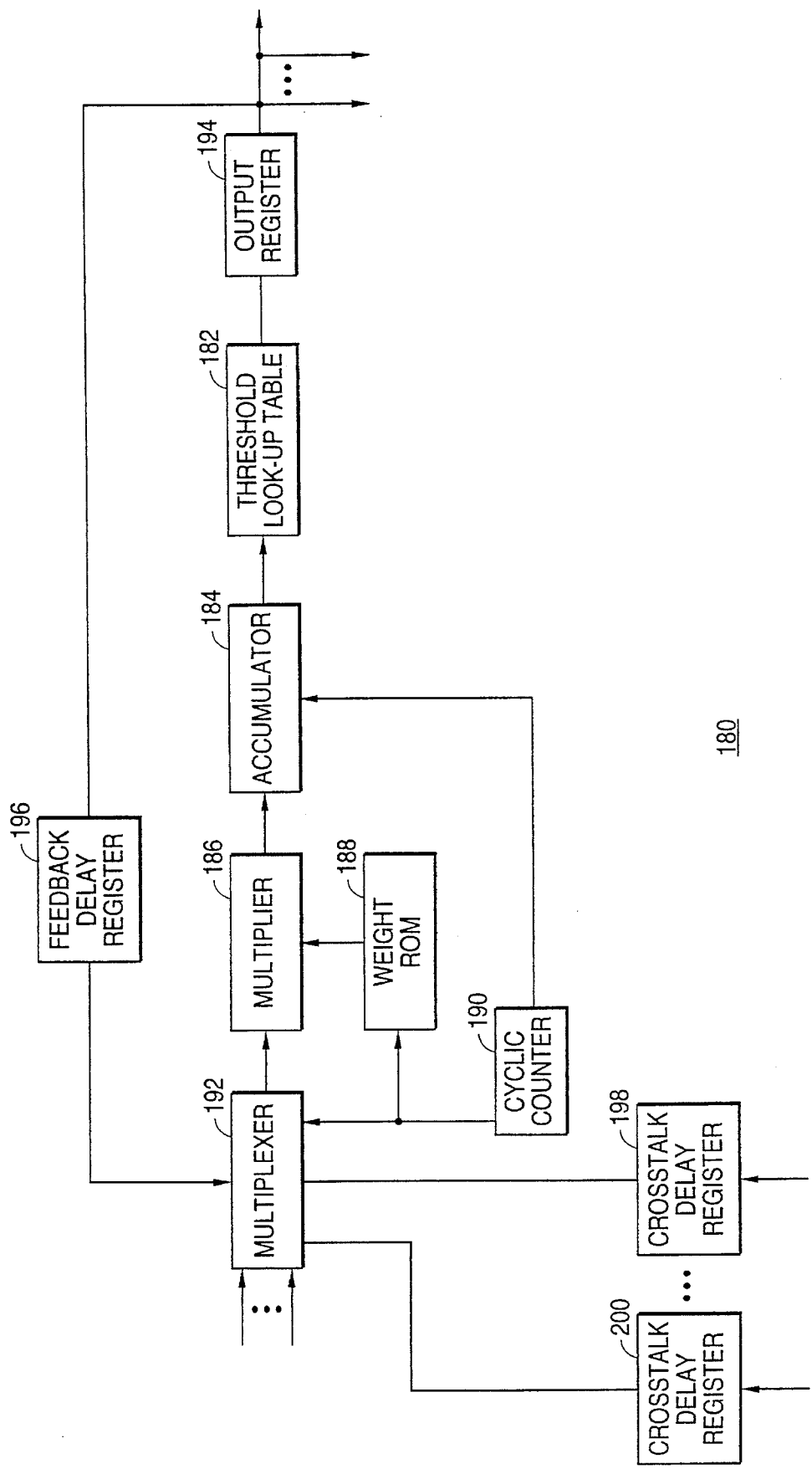
FIG. 7 illustrate a digital implementation of the present invention using discrete components.

A discrete component digital implementation of each node is illustrated in FIG. 7. This node can be implemented with plural nodes on a single chip using conventional very large scale integrated circuit technology. In this embodiment, the transfer function operation is performed by a threshold lookup table 182 which would be implemented by a read only memory (ROM) that performs a conventional transformation of its input to an output using a lookup operation. The sum function of the node is performed by a conventional accumulator 184, while the weight multiplication of the inputs is performed by a conventional multiplier 186 receiving the inputs to the node and multiplying the inputs times a weight output by a weight ROM 188. The selection of weights as well as the selection of inputs to be multiplied is performed by a cyclic counter 190 and a multiplexer 192. When the end of the count has been reached and the count is reset, the cyclic counter 190 outputs a clear signal that clears the accumulator 184. The output of the node is stored in an output register 194 and fed back through a feedback delay register 196 connected to the multiplexer 192. The delay in the crosstalk connections is provided by crosstalk delay registers 198–200. Because the delay is provided by registers, the delay is equal to the time between samples of the input signals to the network. These input and output signals to the node are preferably eight bits. The embodiment illustrated in FIG. 7 requires that each node be connected to also the other nodes by individual busses, which can provide significant interconnection problems on integrated circuit chips and also limits the number of nodes that can be formed on a single chip. This problem can be overcome by connecting the nodes to a bus that connects between two adjacent layers. The input to each node would include a demultiplexer connected to the bus. The demultiplexer would be connected to input registers which would store the inputs from the previous layer as well as the crosstalk links. Such an embodiment would also require an input multiplexer control counter for controlling the selection of the appropriate input storage register in accordance with the node output on the bus. Such an embodiment would also be provided with an output gate for output register 194 which would output contents of the output register 194 onto the bus for the subsequent layer, when the count in the input control counter equals a certain value, thereby placing the output onto the bus for the next layer at the appropriate timing.

Figure 8A:
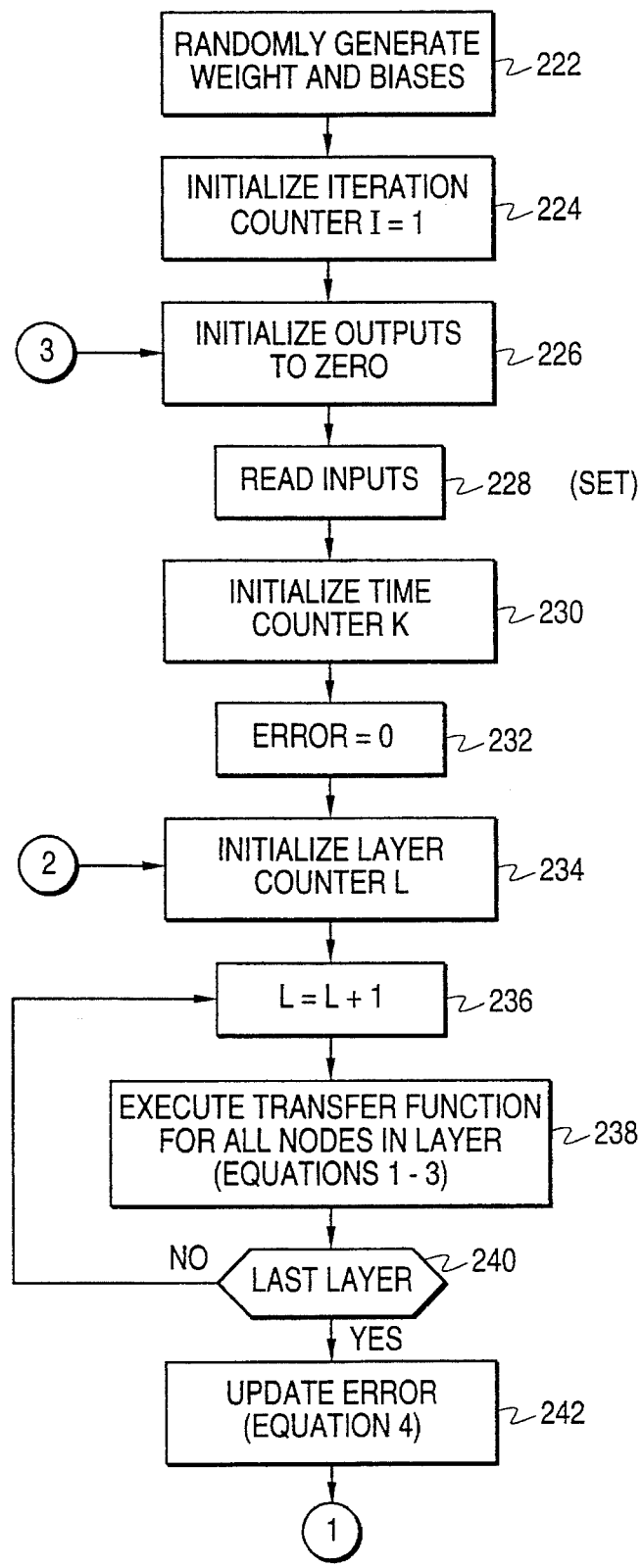
FIGS. 8A and 8B illustrate a first embodiment of an implementation of the present invention in a general purpose computer.
Figure 8B:
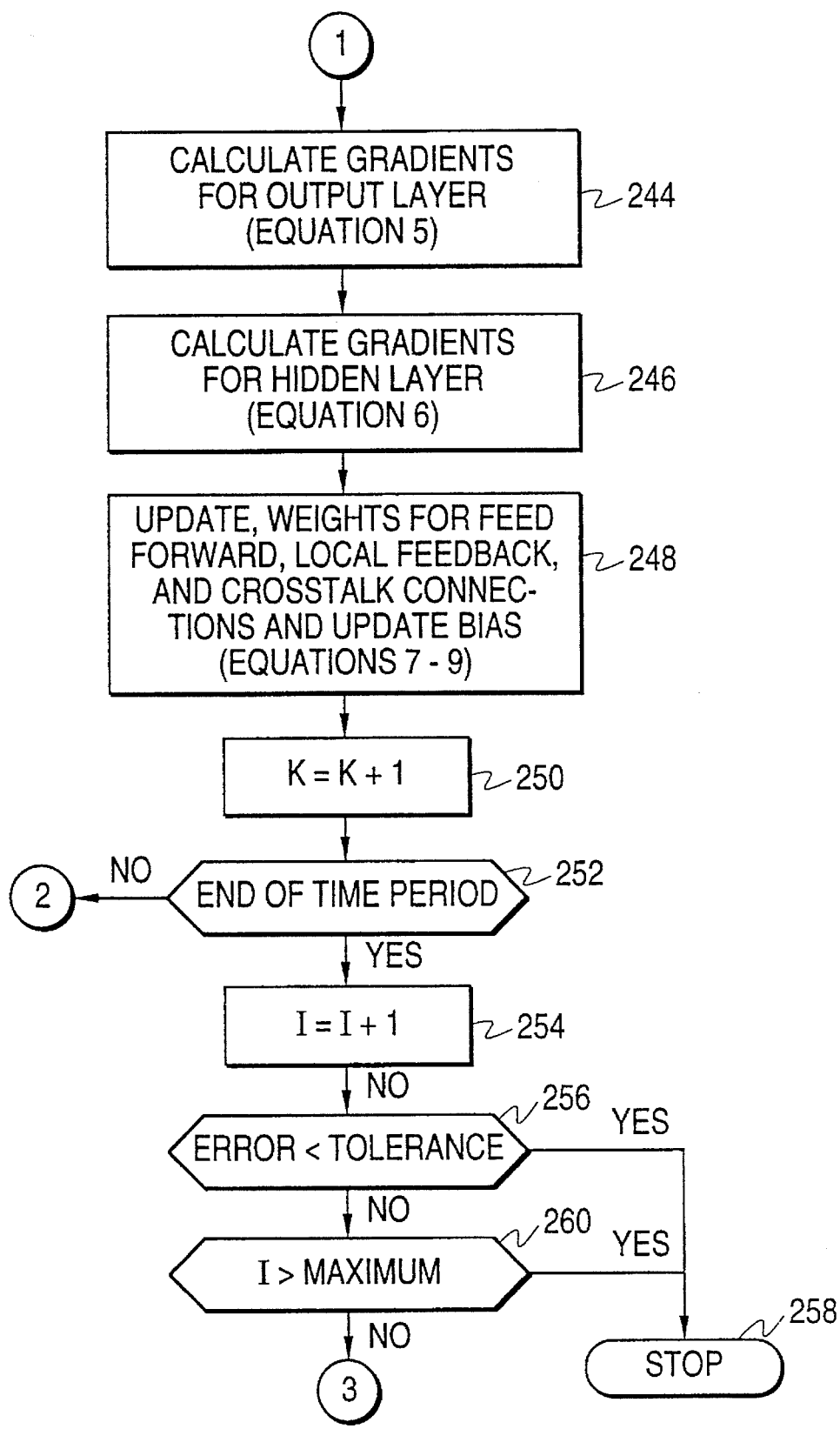

FIGS. 8A and 8B comprise a flowchart of the network of FIG. 1, as well as the learning method, being implemented on a single general purpose processor. It is preferred that a computer, such as the VAX 9000 available from Digital Equipment Corporation which includes a vector processor, be used and that the FORTRAN or "C" languages be used to implement this flowchart. The process essentially performs a multilayer feed forward recurrent transfer operation with static back propagation recurrent gradient descent learning.

The system starts by randomly generating 222 the weights and the bias for each of the nodes followed by initialization 224 of an iteration counter as well as initialization 226 of the outputs to zero. Next, the system reads 228 the entire training input sample set. That is, if the network includes 10 input nodes and there are 100 input samples or steps where each set includes 10 actual inputs, then 100 time sample sets of inputs would be read for a total of 1000 inputs. The system then initializes 230 a time or set counter to one, initializes an error to zero 232 and then initializes 234 a layer counter. The system then enters a loop which performs the transfer function for all of the nodes in all of the layers. The first step in this loop is to increment the layer counter. The system then performs 238 the transfer function for all of the nodes in the layer in accordance with the equations (1)–(3):

$$X_{[1,i]}(k) = U_i(k), \text{ for } i = 1, \ldots, N(l) \text{ and } k = 1, \ldots, T \quad (1)$$

$$Z_{[l,j]}(k) = \sum_{j=1}^{N(l)} W_{[l,j][l,i]} X_{[l,j]}(k-1) + \quad (2)$$

$$\sum_{j=1}^{N(l-1)} W_{[l-1,j][l,i]} X_{[l-1,j]}(k) + b_{[l,i]}, \text{ for } i = 1, \ldots N(l)$$

$$X_{[l,j]}(k) = F_{[l]}(Z_{[l,i]}(k)), \text{ for } i = 1, \ldots, N(l) \quad (3)$$

where k is the time step, L is the total number of layers, l is the layer number, N(l) is the number of nodes in layer l, i is a pointer variable, j is a pointer variable, $U_i(k)$ is the ith input at time step k, $X_{[l,i]}(k)$ is the output of node i of layer l at time step k, $W_{[l,j][l',i]}$ is the weight applied to the signal transferred from the node j of layer l to node i of layer l', where l' can equal l when local feedback or crosstalk occurs, $b_{[l,i]}$ is the bias for node i of layer l and defines the region where each node is active, $Z_{[l,i]}(k)$ is a temporary variable storing the output of the summation of the weight times the inputs, and $F_{[l]}$ is the discriminatory transfer function for the nodes of layer l.

Once the transfer function outputs for all the nodes in the network have been obtained using one of the training sets, the system enters a learning phase. The learning phase involves a backward pass through the network during which the output layer error gradient signals are used to back propagate the error gradients for each node of the hidden layers. Then the network node weights and biases are updated. The transfer function output calculation, backward pass and update is then performed for the remaining training sets. The learning phase steps are discussed in detail below.

The system first determines 240 whether the last layer has been performed and then updates an error in accordance with equation (4).

$$E(\text{new value}) = E(\text{old value}) + (1/2) \sum_{j=1}^{N(L)} (X_{[L,j]}(k) - Y_j(k))^2 \quad (4)$$

where E is the error and $Y_j(k)$ is the target output at the step k. The system then calculates 244 the gradients for the output layer and then calculates 246 the gradients for the hidden layers in accordance with equations (5) and (6).

$$\partial E(k)/\partial X_{[L,i]} = X_{[L,i]}(k) - Y_i(k), \text{ for } i = 1, \ldots, N(L) \quad (5)$$

$$\partial E(k)/\partial X_{[l,j]} = \sum_{i=1}^{N(l+1)} W_{[l,j][l+1,i]} F'_{[l+1]}(Z_{[l+1,i]}(k)) \quad (6)$$
$$\partial E(k)/\partial X_{[l+1,i]}, \text{ for } j = 1, \ldots, N(l)$$

where $\partial E(k)/\partial X_{[l,i]}$ is the gradient and $F'_{[l]}$ is the derivative of $F_{8\ l]}$.

Next, the system updates 248 weights for the feed forward connections in accordance with equation (7) as well as the local feedback and crosstalk connections in accordance with equation (8) and also updates the bias in accordance with equation (9).

$$W_{[l-1,j][l,i]} = W_{[l-i,j][l,i]} - \eta \partial E(k)/\partial X_{[l,i]} F'_{[l]}(Z_{[l,i]}(k)) X_{[l-1,j]}(k), \text{ for all } l, i \text{ and } j \quad (7)$$

$$W_{[l,j][l,i]} = W_{[l,j][l,i]} - \eta \partial E(k)/\partial X_{[l,i]} F'_{[l]}(Z_{[l,i]}(k)) X_{[l,j]}(k-1) \text{ for all } l, i \text{ and } j \quad (8)$$

$$b_{[l,i]} = b_{[l,i]} - \eta \partial E(k)/\partial X_{[l,i]} F'_{[l]}(Z_{[l,i]}(k)) \text{ for all } l \text{ and } i \quad (9)$$

where η is the learning rate which is preferably set at 0.005 to 0.1.

This having been done the system then increments 250 the time step counter and determines 252 whether the end of the time period has been reached. If the end of the time period has not been reached, the system cycles back to continue processing. If the end of the time period has been reached the iteration counter is incremented 254 and then the error is compared to 256 an error tolerance where it is preferred that error tolerance be approximately from 0.1% to 1%. If the error has been reduced below the tolerance the system stops. Otherwise a determination 260 is made as to whether the iteration count is greater than the maximum iteration count, where the maximum number of iterations is preferably one-hundred thousand. If the maximum number of iterations have been performed the system stops otherwise the system returns to perform another iteration.

Once the system has completed the learning phase using the training sets, the processor can be connected up to receive actual real time inputs and will predict the outputs of the actual system based on those inputs. When the system is executed in real time after the off-line learning has occurred, if real time learning is desired, only the steps in blocks 228, 236, 238, 240, 244, 246 and 248 are performed. If the system is not intended to continue learning only the functions in steps 228, 236, 238 and 240 are performed.

Figure 9A:
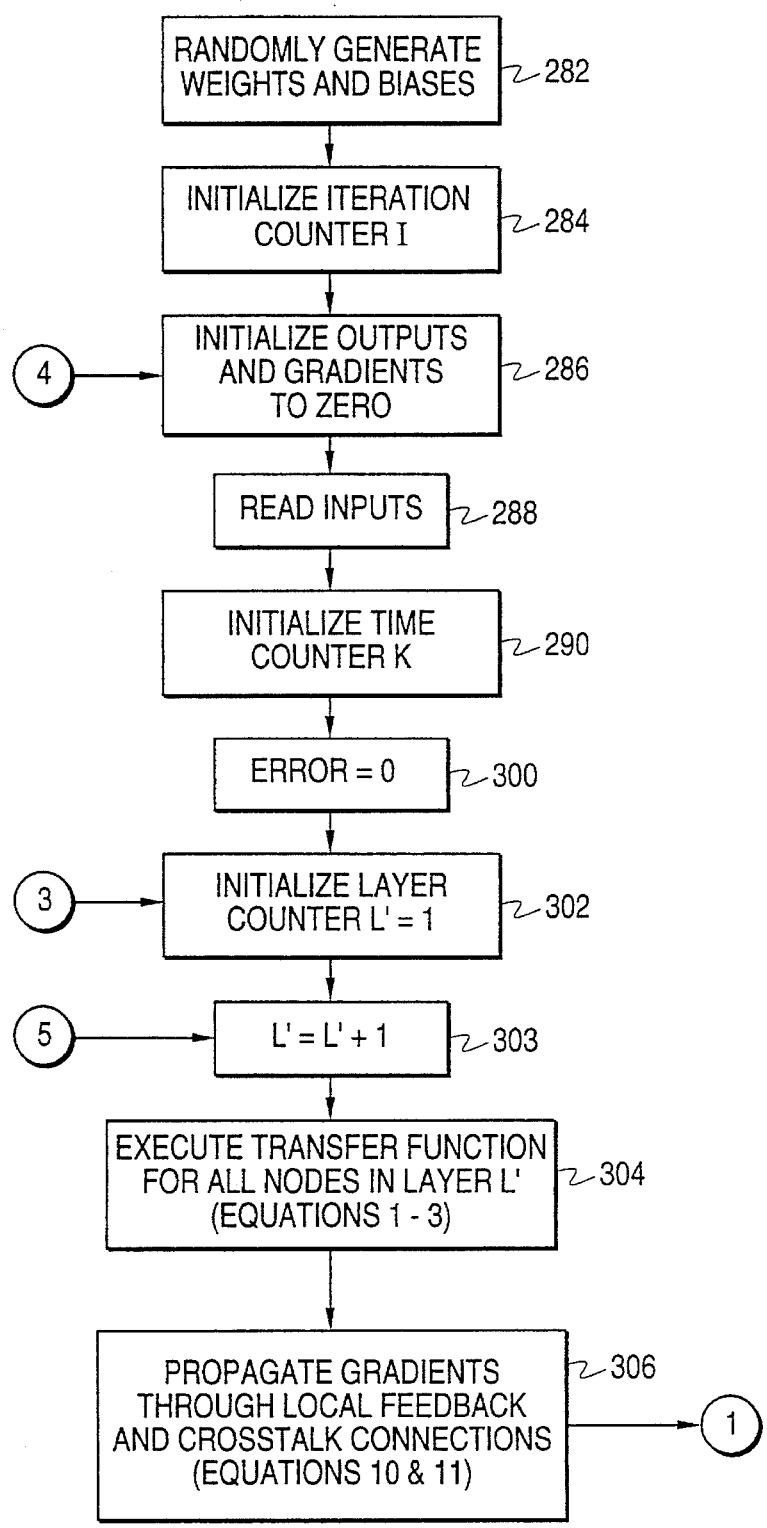
FIGS. 9A–9C illustrate a second embodiment implemented in a general purpose computer.
Figure 9B:
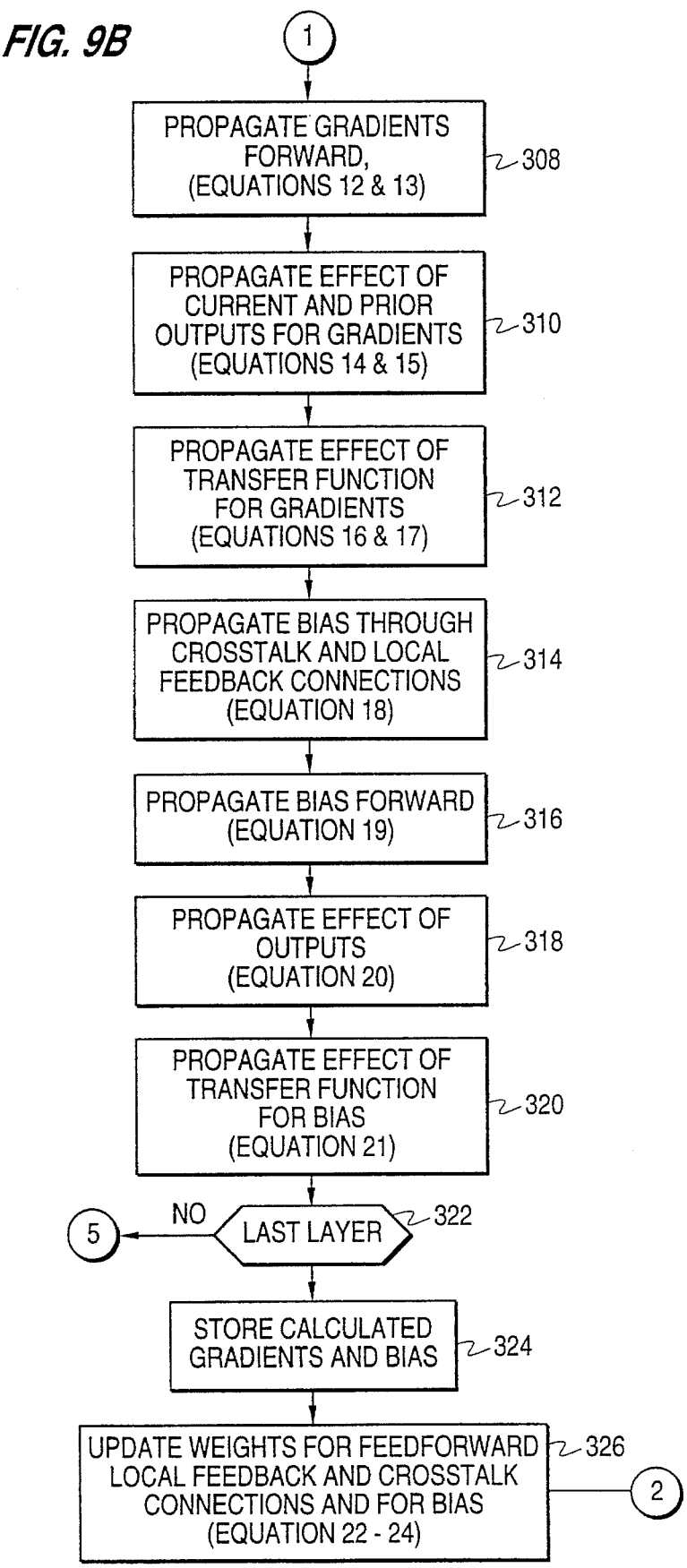
Figure 9C:
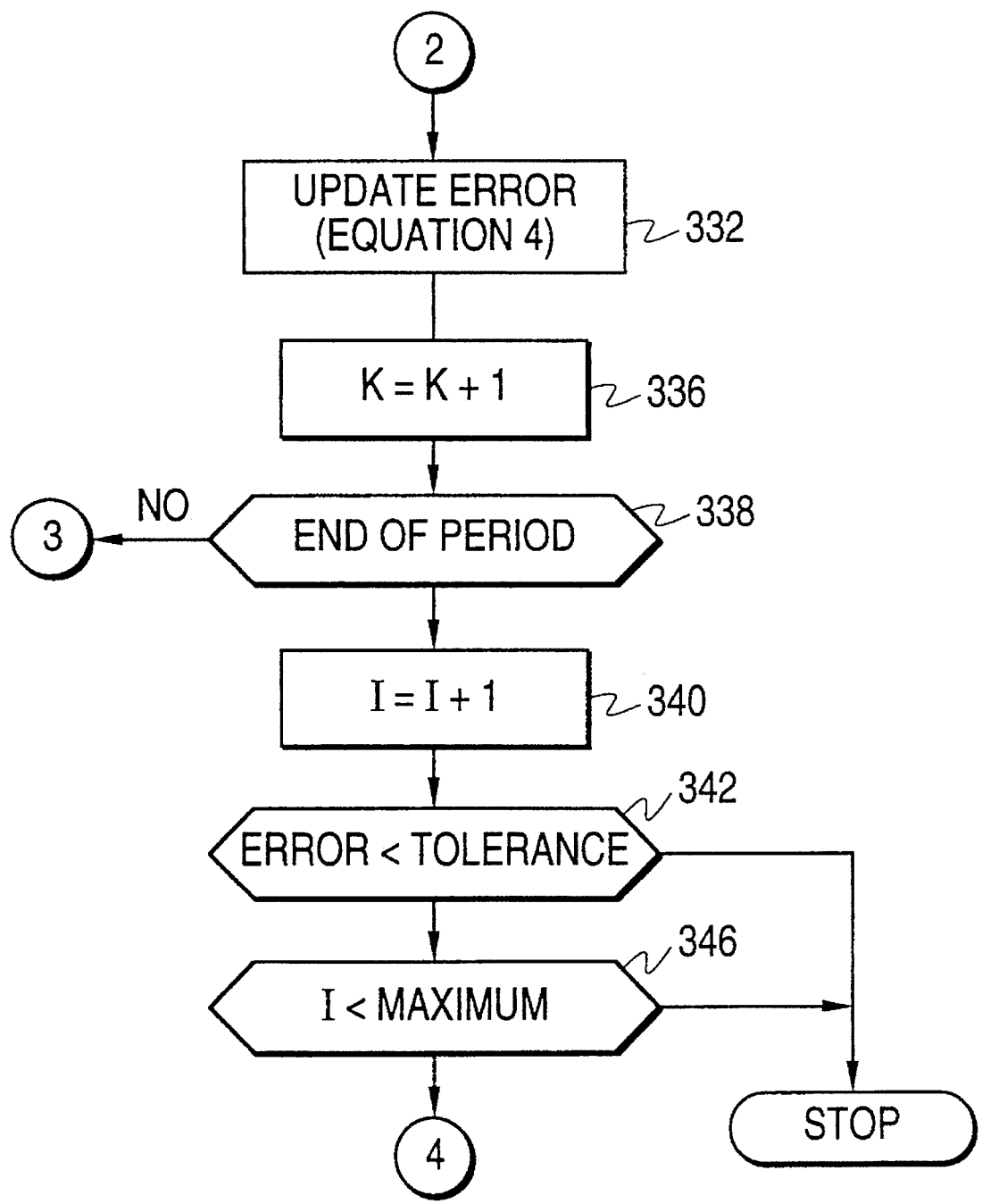

The embodiment illustrated in FIGS. 8A and 8B is what is called a static embodiment in which all of the outputs of the nodes are calculated before the gradients are calculated and before the new weights for the nodes are also calculated. In an alternate and more preferred embodiment the error gradients are held over to the next step, so that past values of the error gradients are accounted for to allow dynamic learning. In this alternate embodiment the invention forward propagates the gradients and as a result can perform the gradient calculation for a layer of nodes immediately after performing the output calculations for the nodes of that layer. This embodiment thus essentially performs a multi-layer recurrent transfer operation with dynamic recurrent gradient descent learning. This process is illustrated in the embodiment of FIGS. 9A–9C.

As in the previous embodiment, the present invention randomly generates 282 the weights and the biases for each node in each layer and initializes 284 an iteration counter. Instead of just initializing the outputs to zero the present invention also initializes 286 the gradients to zero. When in the learning mode, the system, as in the previous embodiment, also reads 288 the input set followed by initializing 290 the time counter and initializing 300 the error. Next the system initializes 302 the layer counter, increments 303 the counter and then executes 304 the transfer function for all the nodes in the layer in accordance with equations (1)–(3) previously discussed.

Once the transfer function outputs are produced for a layer the system enters the learning phase in which the output gradients for the layer are determined in terms of the output gradients of the previous layer and the output gradients of the previous time step until the current layer gradients are obtained. That is in the first pass through a layer the outputs are obtained and in the second pass the output gradients are propagated forward. As a result the present method eliminates the need to wait until the outputs at the output layer are produced before weight change calculations can occur, thereby speeding up the learning process. The details of the learning phase will be discussed in more detail below.

The system determines the gradients for the current layer by first propagating 306 the gradients through the local feedback and crosstalk connections in accordance with equations (10) and (11):

$$S_1(l,n,i,j) = \sum_{m=1}^{N(l')} W_{[l',m][l',n]}(\partial X_{[l',m]}(k-1)/\partial W_{[l,j][l,i]}) \quad (10)$$
for $l \leq l'$, all $n$, $i$ and $j$ $$S_2(l,n,i,j) = \sum_{m=1}^{N(l')} W_{[l',m][l',n]}(\partial X_{[l',m]}(k-1)/\partial W_{[l-1,j][l,i]}) \quad (11)$$
for $l \leq l'$, all $n$, $i$ and $j$ where $S_1$ and $S_2$ are temporary variables for storing the effect on the weights on the gradients, l is the layer associated with the currently considered weight, and n, i and j are network variables. Then during the gradient calculations for the layer the system propagates 308 the gradients forward from the previous layer through the feed forward connections in accordance with equations (12) and (13):

$$S_1(l,n,i,j) = \quad (12)$$

$$S_1(l,n,i,j) + \sum_{m=1}^{N(l'-1)} W_{[l'-1,m][l',n]}(\partial X_{[l'-1,m]}(k)/\partial W_{[l,j][l,i]})$$
for $l < l'$, all $n$, $i$ and $j$ $$S_2(l,n,i,j) = \quad (13)$$

$$S_2(l,n,i,j) + \sum_{m=1}^{N(l'-1)} W_{[l'-1,m][l',n]}(\partial X_{[l'-1,m]}(k)/\partial W_{[l-1,j][l,i]})$$
for $l < l'$, all $n$, $i$ and $j$ followed by propagating 310 the effect of the current and prior outputs of nodes in accordance with equations (14) and (15):

$$S_1(l,n,i,j)=S_1(l,n,i,j)+X_{[l',j]}(k-1) \text{ for all } n, j, l=l' \text{ and } i=n \quad (14)$$

$$S_2(l,n,i,j)=S_2(l,n,i,j)+X_{[l'-1,j]}(k) \text{ for all } n, j, l=l' \text{ and } i=n \quad (15)$$

and then propagating 312 the effect of the transfer function on the gradients in accordance with equations (16) and (17):

$$\partial X_{new[l',n]}(k)/\partial W_{[l,j][l,i]}=S_1(l,n,i,j)*F'_{[l']}(Z_{[l',n]}(k)) \text{ for all } l, n, i \text{ and } j \quad (16)$$

$$\partial X_{new[l',n]}(k)/\partial W_{[l-1,j][l,i]}=S_2(l,n,i,j)* F'_{[l']}(Z_{[l',n]}(k)) \text{ for all } l, n, i \text{ and } j \quad (17)$$

where $\partial X_{new}/\partial W$ is the new value for the output gradient.

Next for this layer the biases are propagated within the layer by first propagating 314 the bias through the crosstalk and local feedback connections in accordance with equation (18):

$$S_3(l,n,i) = \sum_{m=1}^{N(l')} W_{[l',m][l',n]}(\partial X_{[l',m]}(k-1)/\partial b_{[l,i]}) \quad (18)$$
for $l \leq l'$ and all $n$ and $i$ propagating 316 the biases forward in accordance with equation 19, propagating 318 the effect of the outputs in accordance with equation (20) and propagating 320 the effect of the transfer function for the bias in accordance with equation (21).

$$S_3(l,n,i) = S_3(l,n,i) = \sum_{m=1}^{N(l'-1)} W_{[l'-1,m][l',n]}(\partial X_{[l'-1,m]}(k)/\partial b_{[l,i]}) \quad (19)$$

for $l < l'$ and all $n$ and $i$ $$S_3(l,n,i) = S_3(l,n,i) = +1 \text{ for all } n, l = l' \text{ and } i = n$$

$$\partial X_{new[l',n]}(k)/\partial b_{[l,i]} = S_3(l,n,i) * F'_{[l']}(A_{[l',n]}(k)) \quad (20)$$

for all $l$, $n$ and $i$ \quad (21)

The system then determines 322 whether all the layers have been processed and if not returns to perform further processing. If all of the layers have been processed, the system stores 324 the calculated gradients and biases for use in future weight calculations where equations (10), (11) and (18) have taken prior gradients into account.

$$\partial X_{[l',n]}(k)/\partial W_{[l,j][l,i]} = \partial X_{new[l',n]}(k)/\partial W_{[l,j][l,i]} \quad (22)$$

$$\partial X_{[l',n]}(k)/\partial W_{[l-1,j][l,i]} = \partial X_{new[l',n]}(k)/\partial W_{[l-1,j][l,i]} \quad (23)$$

$$\partial X_{[l',n]}(k)/\partial b_{[l,i]} = \partial X_{new[l',n]}(k)/\partial b_{[l,i]} \text{ for all } l, l', n, i \text{ and } j. \quad (24)$$

This step results in dynamic learning.

Next the system calculates the weights for the nodes in the layer for the feed forward (equation 25), local feedback and crosstalk connections (equation 26) and updates the bias in accordance with equation (27).

$$W_{[l,j][l,i]} = W_{[l,j][l,i]} - \eta \sum_{n=1}^{N(L)} (X_{[L,n]}(k) - Y_n(k)) \quad (25)$$

$(\partial X_{[L,n]}(k)/\partial W_{[l,j][l,i]})$ for all $l$, $i$ and $j$ $$W_{[l-1,j][l,i]} = W_{[l-1,j][l,i]} - \eta \sum_{n=1}^{N(L)} (X_{[L,n]}(k) - Y_n(k)) \quad (26)$$

$(\partial X_{[L,n]}(k)/\partial W_{[l-1,j][l,i]})$ for all $l$, $i$ and $j$ $$b_{[l,i]} = b_{[l,i]} - \eta \sum_{n=1}^{N(L)} (X_{[L,n]}(k) - Y_n(k)) \quad (27)$$

$(\partial X_{[L,n]}(k)/\partial b_{[l,i]})$ for all $l$ and $i$

The system then updates 332 the error in accordance with equation (4). The system then performs the same loop control functions 336–346 as performed in the embodiment described with respect to FIG. 8.

The present invention, as illustrated in FIG. 9, is capable of on-line or off-line supervised learning in which test sets are presented to the network.

Figure 10:
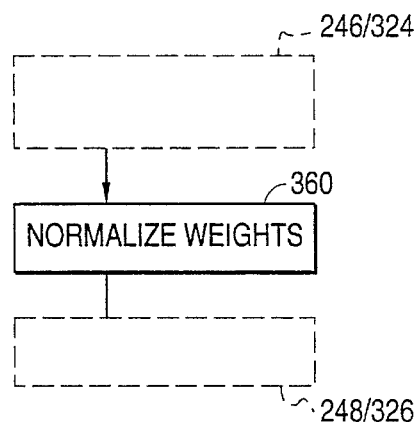
FIG. 10 illustrates a third embodiment of the present invention which can be applied to the embodiments in FIGS. 8 and 9.

Occasionally, a neural network converging toward a global optimal solution will get trapped in a local optimum and in such a situation the present invention can be augmented by a step which forces the network out of a local minimum. In addition, this step results in significant learning acceleration. This is attained by normalizing 360 the weights and biases as illustrated in FIG. 10 in accordance with equations (28)–(30).

$$\|\partial E/\partial r\|^2 = \quad (28)$$

$$\sum_{l=1}^{L} \sum_{i=1}^{N(l)} \sum_{j=1}^{N(l-1)} (\partial E/\partial W_{[l-1,j][l,i]})^2 +$$

$$\sum_{l=1}^{L} \sum_{i=1}^{N(l)} \sum_{j=1}^{N(l)} (\partial E/\partial W_{[l,j][l,i]})^2 + \sum_{l=1}^{L} \sum_{i=1}^{N(l)} (\partial E/\partial b_{[l,j][l,i]})^2$$

$$W_{(new)} = W_{(old)} - \eta(E, \partial E/\partial r, \partial^2 E/\partial r^2, \ldots, \partial^p E/\partial r^p)/\partial E/\partial r^q \quad (29)$$

$$b_{(new)} = b_{(old)} - \eta(E, \partial E/\partial r, \partial^2 E/\partial r^2, \ldots, \partial^p E/\partial r^p)/\partial E/\partial r^q \quad (30)$$

where W is any weight in the network, b is any bias in the network, r is any weight or bias in the network, p is the order of the highest moment of the error gradient used in the learning algorithm defined by the learning algorithm chosen, where in the current situation p=1, q is the power to which the norm of the error gradient is raised, where in the current situation q=2, $\eta(E, \partial E/\partial r, \partial^2 E/\partial r^2, \ldots, \partial^p E/\partial r^p)$ is a positive function of E, such as $\eta(E) = \mu E \partial E/\partial r$ where $\mu$ is a constant such as 0.01. Other functions can be used such as an exponential or hyperbolic tangent. This functional dependence of $\eta$ allows the learning rate to change adaptively with the error E. This method of updating adjusts the learning rate allowing faster convergence to the global optimum with a reasonable number of iterations without adding unnecessary tuning parameters. During operation as the solution approaches a local minimum, because the error does not approach zero, the ratio of the error gradient to the norm squared of the error gradient will approach infinity causing the weights to jump in magnitude thus moving away from the local minimum. However, as the global minimum is approached the error function will approach zero resulting in a smooth convergence of the weights to their optimum values.

The above-described acceleration technique is not limited to the architecture or the learning methods disclosed herein and is applicable to other architectures, such as a feed forward architecture, and to any learning method, such as a back propagation method. In the general case, the weights and the biases are updated according to equations (29) and (30), where $\|\partial E/\partial r\|^2$ means the sum of the squares of $\partial E/\partial w$ for all weights w and the squares of $\partial E/\partial b$ for all biases b in the network.

Figure 11:
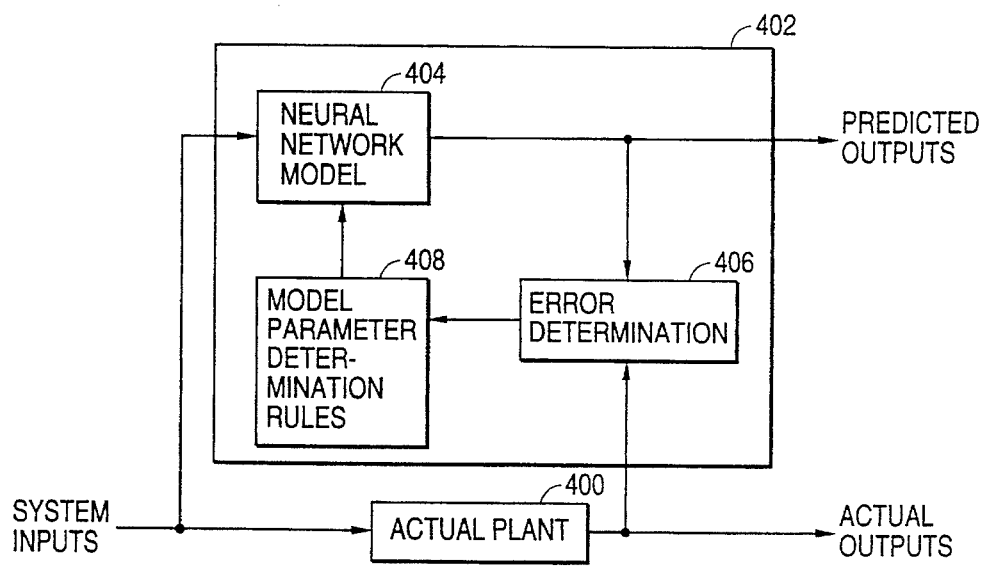
FIG. 11 illustrates the use of the present invention to model a dynamic nonlinear system such as a process control plant.

The present invention can be used to identify or model the behavior of dynamic non-linear system, thereby allowing real time diagnostic and predictive control of large scale complex non-linear dynamic systems, such as power plants. Multiple input multiple output (MIMO) dynamic non-linear systems can be used to model real world MIMO systems such as a process control plant as illustrated in FIG. 11. In such a system, the system inputs to the actual plant 400 are also provided to the present invention 402 and applied to the neural network model 404 as represented by equations (1)–(3). The system determines the 406 error difference between the predicted outputs (equation (4)) and the actual outputs and this is used to change the model parameters using equations (22)–(24) or (7)–(9).

A representative MIMO nonlinear system can be expressed by the following state and output equations (31)–(35):

$$x_1(k) = 0.5[x_1(k-1)]^{1/2} + 0.3x_2(k-1)x_3(k-1) + 0.5u_1(k) \quad (31)$$

$$x_2(k) = 0.5[x_2(k-1)]^{1/2} + 0.3x_3(k-1)x_1(k-1) + 0.5u_1(k) \quad (32)$$

$$i\ x_3(k) = 0.5[x_3(k-1)]^{1/2} + 0.3x_1(k-1)x_2(k-1) + 0.5u_2(k) \quad (33)$$

$$y_1(k) = 0.5(x_1(k) + x_2(k) + x_3(k) \quad (34)$$

$$y_2(k) = 2x_1^2(k) \quad (35)$$

The network 404 used to model this system included an input layer with 2 nodes, 2 hidden layers with 12 and 10 nodes, respectively, and an output layer with 2 nodes (2-12-10-2). The initial training set included of all 25 possible combinations of steps with magnitudes 0.125, 0.25, 0.375, 0.5, as well as the zero input for both input channels. Each signal contained 15 data points. The network was trained for 800 cycles, where one cycle (iteration) consisted of one presentation of the above training set, using a 0.01 learning rate for both the weights and the biases.

Figure 12:
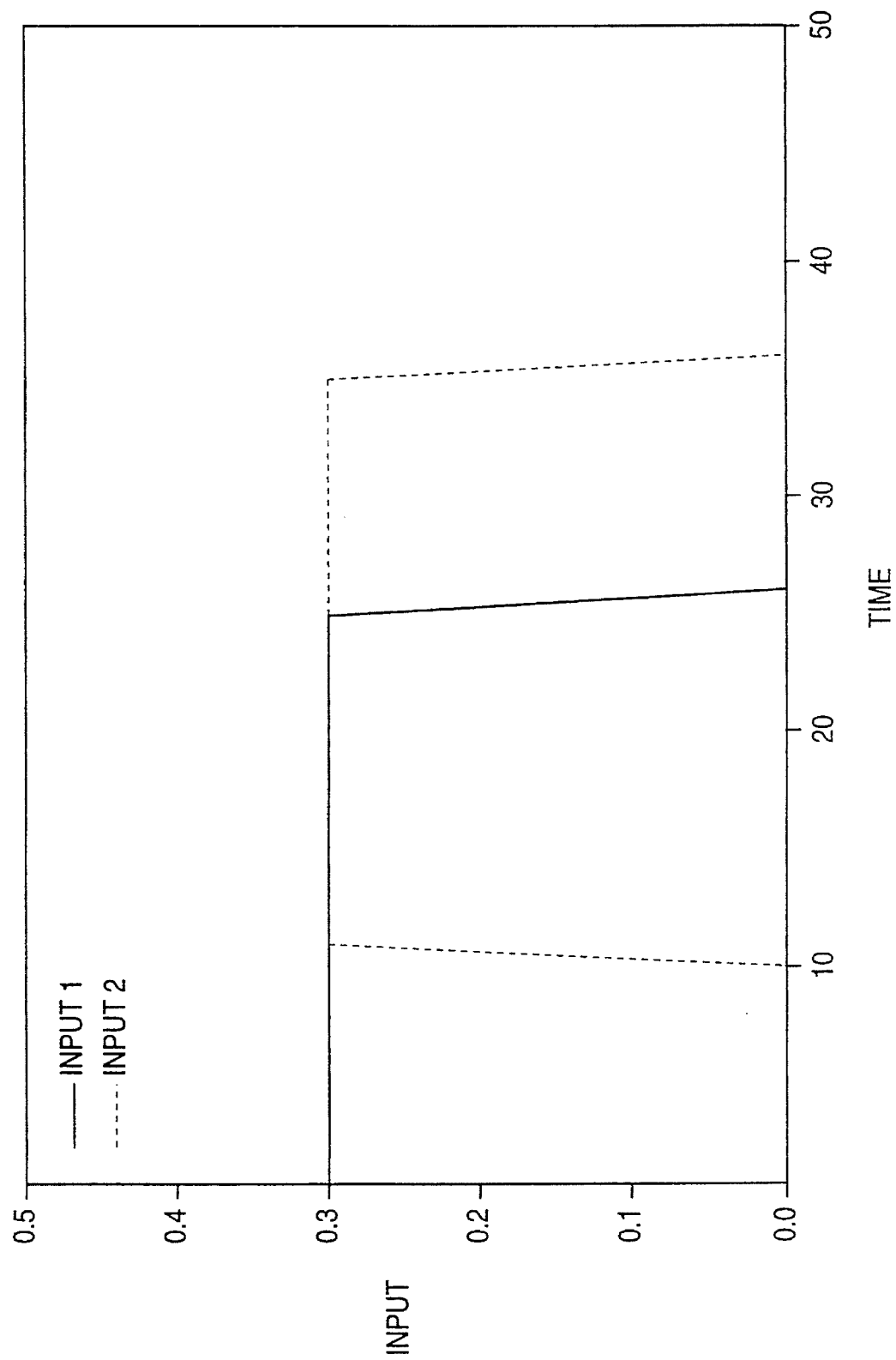
FIGS. 12–15 illustrate the results of using the present invention to model a multiple input multiple output dynamic nonlinear system.

The pulse inputs used to test the identified network are shown in FIG. 12. However, the network response to these impulses was not satisfactory. Initially, the network followed the model closely, however, once the pulses ceased to exist the network and the analytic model reach different equilibrium values. The reason for such behavior turned out to be the two equilibria of the unforced system under consideration. Specifically, ($y_1=0_1$, $y_2=0$) and ($y_1=0.18$, $y_2=0.45$) are the equilibria of the unforced system. The initial training set, however, did not contain any information about the second equilibrium point. Therefore, 5 more pulses of suitable magnitude each containing 40 data points, were included in the initial training set, to account for the observed second equilibrium point. Training was continued with the augmented set for 100 more iterations using the same learning rate as before. This approach indicates that the network is capable of incremental learning for complex systems. That is, initially, a small but representative set of input signals can be considered in the training set. If the network is not capable of generalizing from this limited set of signals, additional training is performed using the network obtained at the end of the previous learning session, with a training set enhanced with more representative signals.

Figure 13:
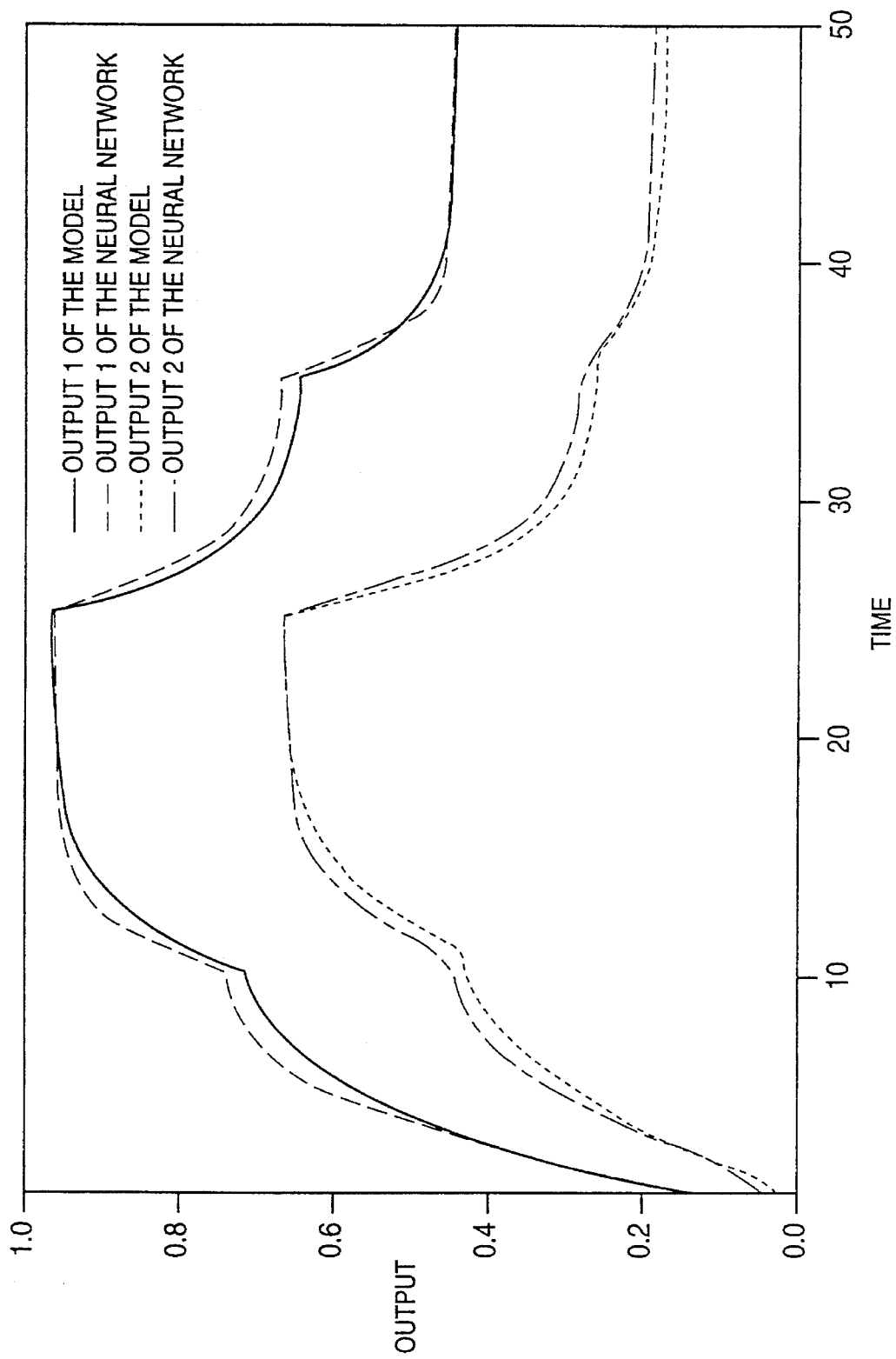
Figure 14:
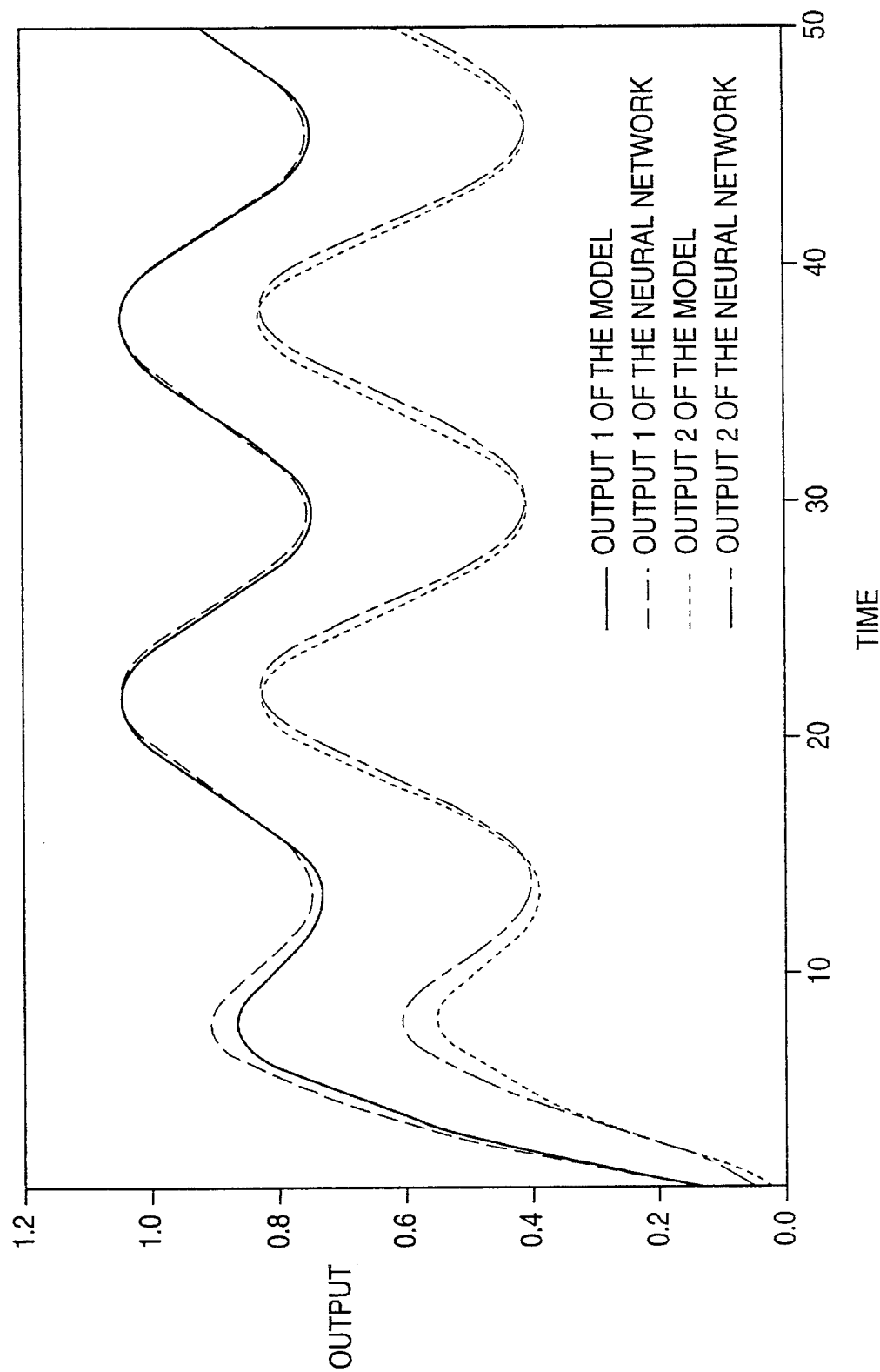
Figure 15:
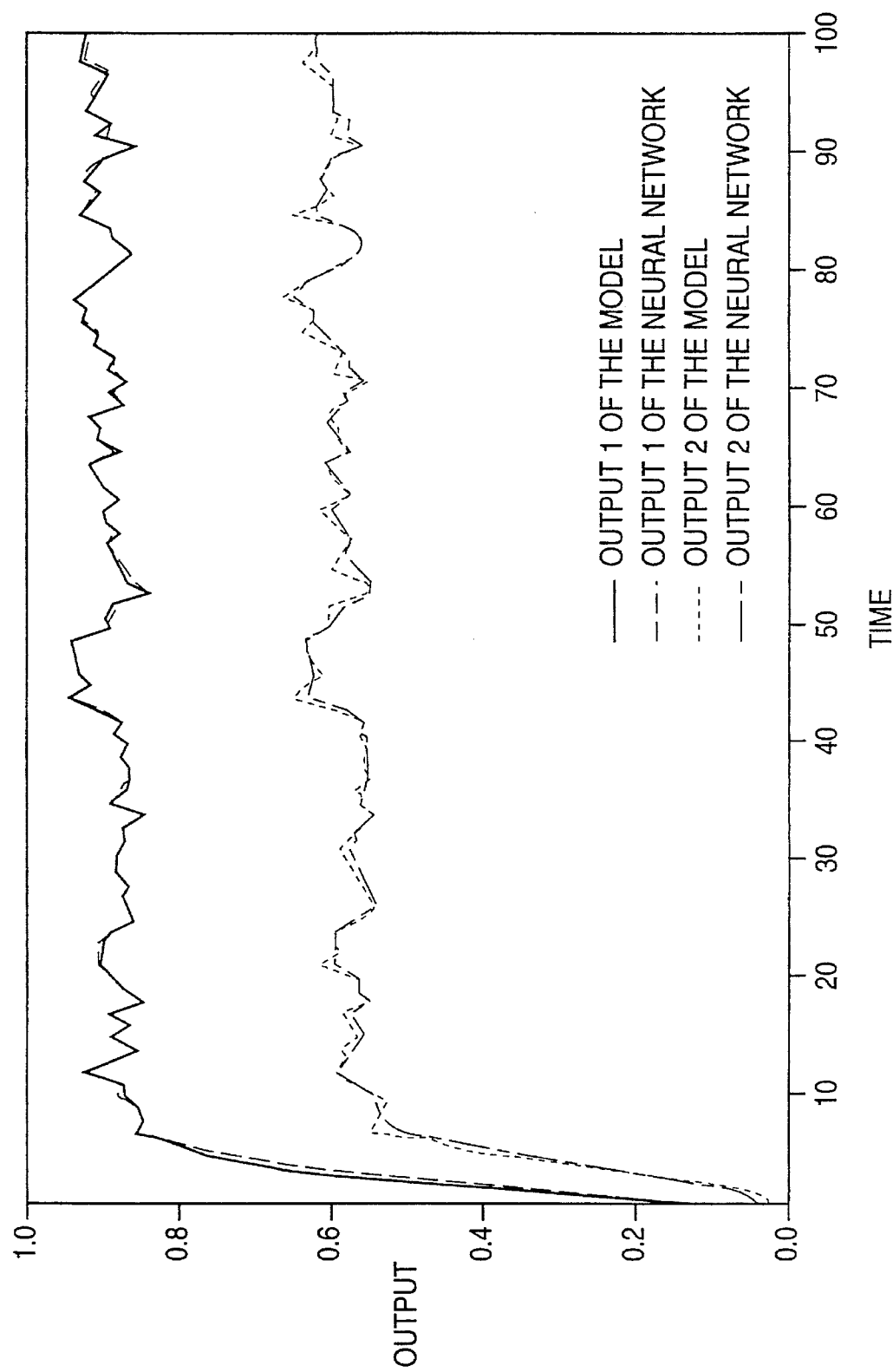

Following training with the augmented input set, three tests were performed with signals unknown to the network for investigating its performance. The network and analytic model responses to the inputs depicted in FIG. 12, are shown in FIG. 13. The calculated RMS prediction error for this signal was 4.8%. The second test:

$$\text{signal was } u_1(k) = 0.3 + 0.2 \sin\left(\frac{\pi k}{8}\right) \quad (36)$$

$$u_2(k) = 0.2, \quad (37)$$

where the step input in the second channel was delayed by 5 time steps. The network and analytic model responses to this input set are depicted in FIG. 14, with the RMS prediction error evaluated at 4.8%. The final test set consisted of a step augmented with zero mean white Gaussian noise of 0.1 standard deviation. The magnitudes for the steps were 0.3 and 0.2 for the two input channels, respectively. FIG. 15 presents the network and analytic model responses to this test signal, with a calculated RMS prediction error of 2.1%.

Figure 16:
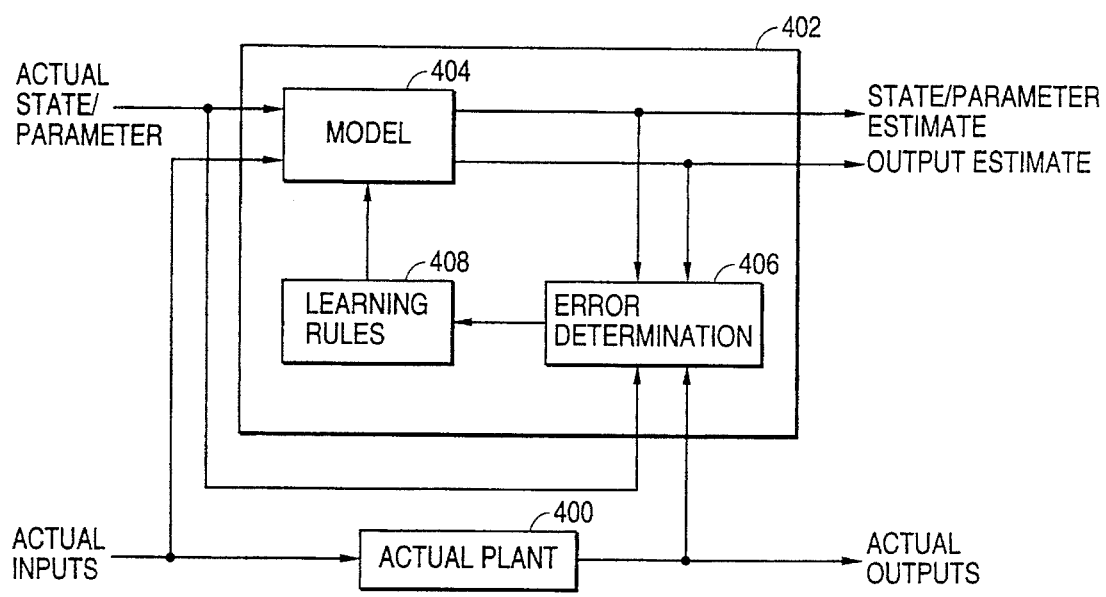
FIG. 16 illustrates using the present invention to determine hidden or unknown states and parameters of a system.

The present invention, as illustrated in FIG. 16, can also be used to identify hidden parameters or states in non-linear systems. The estimation of hidden parameters and states involves inferring unobservable variables or non-measurable parameters, for example, system states which cannot be measured or system parameters which are not known or are varying, based on measured variables. In such a situation the training set applied to the present invention includes the actual state of the unknown parameter at the time the data was taken. For example, when estimating the inertial characteristics of a spacecraft, an input to the invention would be the inertia matrix of the spacecraft for a geometrically known configuration. This inertial matrix would have been calculated apriori using the known spacecraft configuration. The actual inputs to the plant are also provided to the model 404 and the model 404 produces not only output estimates equivalent to the actual outputs for error estimation purposes but also an output which corresponds to the unobserved state of the parameter. This extra parameter in comparison with the actual state of the parameter is included in the error determination operation during training but not during actual use.

Figure 17:
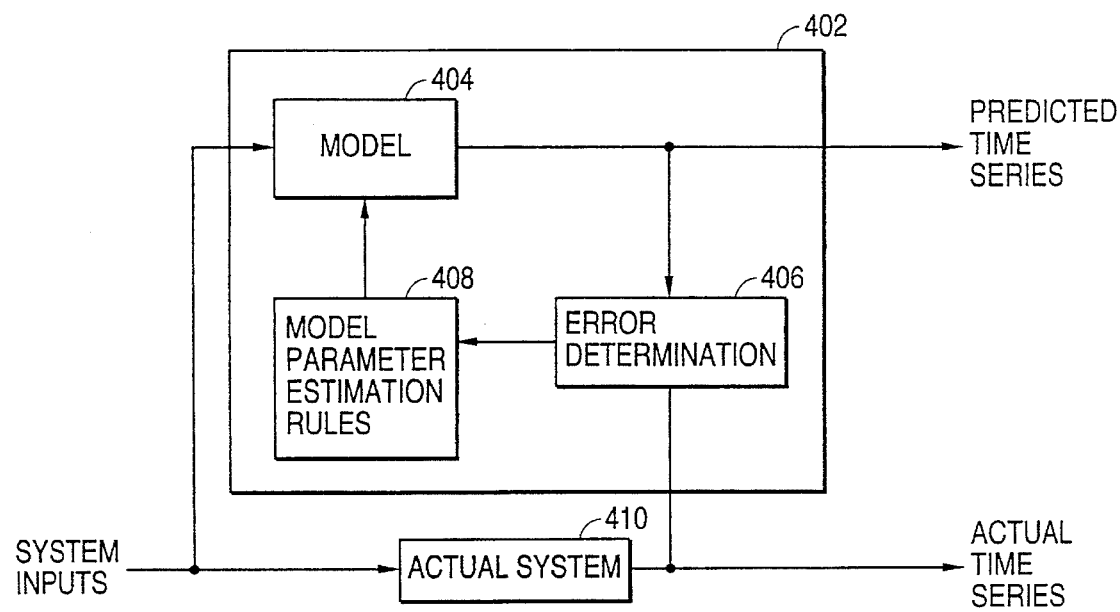
FIG. 17 illustrates using the present invention to model time series system.

As illustrated in FIG. 17 the present invention can also be used to predict time series systems, such as the stock market, by applying the inputs received by the actual time series system to the present invention and developing a time series model in a manner similar to that discussed with respect to FIG. 11. This system is taught and used in a similar manner as discussed with respect to FIG. 11.

Figure 18:
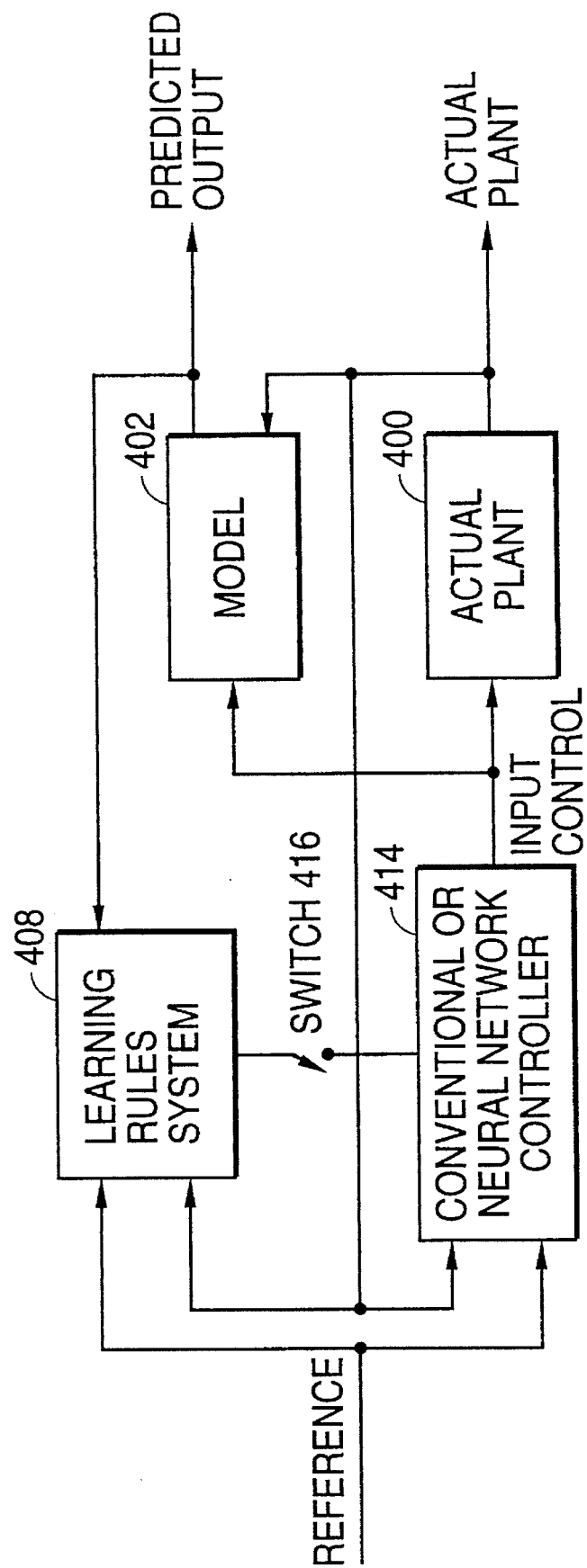
FIG. 18 illustrates a control system using the present invention.

Furthermore, as illustrated in FIG. 18 the present invention can be used to control non-linear dynamic systems, such as spacecraft systems or process systems by developing a model 402 of the plant as discussed with respect to FIG. 11 and then using conventional learning rules system 408 to adapt the adjustable parameters of a conventional controller 414 (such as a proportional-integral or state feedback controller) or a neurocontroller. In this embodiment a switch 416 is used to initiate or terminate learning. The switching is controlled by the system operator or by control software and the reference in FIG. 18 represents the desired plant operating set-point or trajectory.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. The node and network of present invention have been described using a gradient descent learning method, however, other methods can be used.

What is claimed is:

1. A neural network system, comprising:

a hidden layer with nodes each transforming input signals into an output signal using weights for weighting and a memory for storing signals; and teaching means for forward propagating error gradients in the nodes and normalizing weights responsive to an error.

2. A method of teaching a neural network having interconnected layers, comprising the steps of:

(a) applying test input signals to the network;

(b) producing, by a first of the layers, first output signals by transforming the input signals into the first output signals using a memory for storing intermediate signals;

(c) calculating weights for the first of the layers by performing dynamic recurrent gradient descent learning; and (d) producing, by a second of the layers after step (c), second output signals form the first output signals.

3. A method of teaching a neural network having interconnected layers, comprising the steps of:

(a) applying test input signals to the network;

(b) producing, by a first of the layers, first output signals by transforming the input signals into the first output signals using a memory for storing intermediate signals;

(c) calculating weights for the first of the layers by calculating the weights from prior gradients; and (d) producing, by a second of the layers after step (c), second output signals form the first output signals.

4. A method of teaching a neural network having interconnected layers, comprising the steps of:

(a) applying test input signals to the network;

(b) producing, by a first of the layers, first output signals by transforming the input signals into the first output signals using a memory for storing intermediate signals;

(c) calculating weights for the first of the layers by normalizing the weights responsive to an error; and (d) producing, by a second of the layers after step (c), second output signals from the first output signals.

5. A method of teaching a neural network having interconnected layers, comprising the steps of:

(a) applying the test input signals to the network;

(b) producing, by a first of the layers, first output signals by transforming the input signals into the first output signals using a memory for storing intermediate signals;

(c) calculating weights for the first of the layers; and (d) producing, by a second of the layers after step (c), second output signals from the first output signals wherein the network includes local feedback and crosstalk and step (b) includes producing the first output signals using the local feedback and crosstalk and step (c) includes calculating the weights using the local feedback and crosstalk.

6. A method of performing neural network processing for interconnected layers, comprising the steps of:

(a) feeding output signals forward from a first hidden layer to a second hidden layer; and (b) calculating output signals for the second hidden layer by transforming the output signals from the first hidden layer, delayed crosstalk output signals from the second hidden layer and delayed local feedback output signals from the second hidden layer stored in a local feedback memory into the output signals.

7. A method as recited in claim 6, further comprising:

(c) updating gradients for the second hidden layer immediately after step (b).

* * * * *

UNITED STATES PATENT AND TRADEMARK OFFICE
CERTIFICATE OF CORRECTION

PATENT NO. : 5,479,571
DATED : DECEMBER 26, 1995
INVENTOR(S) : Alexander G. PARLOS, et al.

It is certified that error appears in the above-indentified patent and that said Letters Patent is hereby corrected as shown below:

TITLE PAGE [56], OTHER PUBLICATIONS, line 1, "ot" should be --to--;
line 2, "Additson" should be --Addison--.

PAGE 2, OTHER PUBLICATIONS,

Col. 1, line 43, "Heck" should be --Hecht--;
line 49, "CMU-CU" should be --CMU-CS--.

Col. 2, line 3, "Adaptive" should be --Adaptation--;
line 16, "an" should be --and--;
line 47, "Control Systems" should be
--IEEE Control Systems--.

Col. 5, line 16, "also" should be --all.

Col. 6, line 52, "$F_{81]}$." should be --$F_{[1]}$.--.

UNITED STATES PATENT AND TRADEMARK OFFICE
CERTIFICATE OF CORRECTION

PATENT NO. : 5,479,571
DATED : DECEMBER 26, 1995
INVENTOR(S) : Alexander G. PARLOS, et al.

It is certified that error appears in the above-indentified patent and that said Letters Patent is hereby corrected as shown below:

Col. 9, line 7, (Equation (20)), "A" should be --Z--;

col. 9, line 66, (Equation (29)), "/ $\partial E/\partial r^q$" to --/ $||\partial E/\partial r||^q$--;

col. 10, line 3, (Equation (30)), "/ $\partial E/\partial r^q$" to --/ $||\partial E/\partial r||^q$--.

line 60, (Equation (34)), +$x_3(k)$" should be --+$x_3(k)$)--.

Signed and Sealed this

Twenty-second Day of October, 1996

Attest:

BRUCE LEHMAN

*Attesting Officer*   *Commissioner of Patents and Trademarks*